US007773643B2

(12) United States Patent
Masuda

(10) Patent No.: US 7,773,643 B2
(45) Date of Patent: Aug. 10, 2010

(54) LASER LIGHT GENERATING APPARATUS

(75) Inventor: Hisashi Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/012,681

(22) Filed: Feb. 5, 2008

(65) Prior Publication Data

US 2008/0240176 A1    Oct. 2, 2008

(30) Foreign Application Priority Data

Mar. 28, 2007    (JP)    ............... P2007-085305

(51) Int. Cl.
*H01S 3/10*    (2006.01)
(52) U.S. Cl. .............. 372/26; 372/12; 372/21; 372/25; 372/93; 372/97
(58) Field of Classification Search .............. 372/12, 372/21, 25, 26, 93, 97
See application file for complete search history.

(56) References Cited

U.S. PATENT DOCUMENTS

| | | | | |
|---|---|---|---|---|
| 5,621,744 | A * | 4/1997 | Kikuchi et al. | ......... 372/12 |
| 6,088,379 | A * | 7/2000 | Owa et al. | ......... 372/97 |
| 6,249,371 | B1 * | 6/2001 | Masuda et al. | ......... 359/326 |
| 6,285,691 | B1 | 9/2001 | Kaneda et al. | |
| 6,714,567 | B2 * | 3/2004 | Masuda | ......... 372/21 |
| 6,862,131 | B2 * | 3/2005 | Masuda | ......... 359/326 |
| 7,110,426 | B2 * | 9/2006 | Masuda | ......... 372/21 |
| 2002/0034198 | A1 * | 3/2002 | Masuda | ......... 372/5 |
| 2002/0171912 | A1 | 11/2002 | Masuda | |
| 2003/0198261 | A1 * | 10/2003 | Masuda | ......... 372/21 |

FOREIGN PATENT DOCUMENTS

| | | |
|---|---|---|
| DE | 10 2005 015 497 | 10/2006 |
| JP | 2002-311467 | 10/1998 |
| JP | 11-317567 | 11/1999 |
| JP | 2003-050413 | 2/2003 |

\* cited by examiner

*Primary Examiner*—Minsun Harvey
*Assistant Examiner*—Yuanda Zhang
(74) *Attorney, Agent, or Firm*—Robert J. Depke; Rockey, Depke & Lyons, LLC

(57) ABSTRACT

A laser light generating apparatus includes a laser light source, a phase-modulator, a signal generating unit configured to generate a modulation signal applied to the phase-modulator, a first external resonator, a second external resonator disposed at the stage succeeding the first external resonator, nonlinear optical elements each provided in the external resonators configured to implement wavelength conversion, an optical path length varying unit for varying the optical path length of each of the external resonators, and a control circuit having a negative feedback arrangement configured to obtain error signals for each of the external resonators, and configured to control the optical path length varying unit using the error signals according to FM sideband method. In the laser light generating apparatus, the external resonators are each held simultaneously in a resonance state by setting the frequency of the modulation signal and by controlling the optical path length of each of the external resonators.

10 Claims, 13 Drawing Sheets

EFFECTIVE REFLECTIVITY

EFFECTIVE REFLECTIVITY

FREQUENCY (CONVERTED INTO PARAMETER $\delta'$)

FIRST STAGE
(1064 → 532 nm)

SECOND STAGE
(532 → 266 nm)

THIRD STAGE
(266 → 198 nm)

LASER LIGHT GENERATING APPARATUS

CROSS REFERENCES TO RELATED APPLICATIONS

The invention contains subject matter related to Japanese Patent Application JP2007-85305 filed in the Japanese Patent Office on Mar. 28, 2007, the entire contents of which being incorporated herein by reference.

BACKGROUND OF THE INVENTION

1. Field of the Invention

The invention generally relates to laser light generating apparatuses. More particularly, the invention relates to a laser light generating apparatus including a laser light source and a plurality of external resonators, for achieving stable locking of the apparatus utilizing a single modulation signal.

2. Description of the Related Art

An FM sideband technology ("Pound-Drever-Hall Locking" technology) is typically known as an example of a technology for stable locking of an external resonator in a laser light generating apparatus, and is widely used for locking external resonators.

In the FM sideband method, sideband waves are generated using a phase-modulator disposed at a stage preceding an external resonator to generate an error signal. In a case where the sideband waves are generated by modulating ultraviolet light, in particular, a high-performance phase-modulator is desirable, having a high light transmittance and low operating voltages.

According to the related art technology, to avoid undue damages of the phase-modulator, which are caused by the ultraviolet light, the locking of the ultraviolet light is carried out by structuring a laser light generating apparatus including a plurality of external resonators, locking simultaneously the plurality of external resonators according to the FM sideband technology, and implementing wavelength conversion over multiple stages. When two external resonators are used, for example, the abovementioned steps are carried out by first disposing a first phase-modulator at the stage preceding the first external resonator to be subjected to locking according to the FM sideband technology, allowing the light subjected to wavelength conversion by the first external resonator (i.e., generation of a wavelength-converted light), to be incident on a second phase-modulator, allowing light emerging from the second phase-modulator to be incident on a second external resonator, and subsequently implementing the locking of the second external resonator, followed by another wavelength conversion.

However, in the abovementioned arrangement having a plurality of resonators to be locked simultaneously, there are utilized as many phase-modulators as the external resonators, since one phase-modulator is disposed at the stage preceding each of the external resonators. In addition, the phase-modulator is relatively expensive to make because of optical crystals (nonlinear optical elements) included therein as major components. Therefore, an increase in the number of resonators has resulted in unduly increase in size as a whole and cost of the apparatus.

Further, in the case of ultraviolet light as the light output following the wavelength conversion, a relatively small number of phase-modulators are operable with the ultraviolet light, having low light transmittance and inferior figure of merit. This results in several difficulties such as the provision of a high voltage power source for supplying high operating voltages and a relatively short life span due to damages caused by the ultraviolet light.

Japanese Unexamined Patent Application Publication No. 2002-311467 discloses a device and a method, in which multiple-stage locking is carried out by inputting plural modulation signals (carriers) to a phase-modulator.

Although the device and method described in the abovementioned application publication are capable of compensating some of previous difficulties, several points are yet to be addressed such as the use of a plurality of modulation signal generation units for supplying a plurality of modulation signals and increased complication of signal processing in the device and method.

As to the method of locking external resonators at multiple stages using one single modulation signal, it is desirable to stabilize the locking (resonance state) by increasing the proportion of modulated light reflected from an external resonator at the first stage as much as possible so as to increase S/N ratios of error signals, and simultaneously by allowing the modulated light to pass through the external resonator at the first stage as much as possible so as to increase S/N ratios of error signals detected by other external resonators at each of the succeeding stages. Thus, this gives rise to tradeoff in view of fulfilling simultaneously both abovementioned conditions for respective external resonators.

Therefore, when external resonators as a whole are not optimized in early stages following setting renewal, or the change over time in transmission widths of external resonators takes place due to changes in resonator loss and in conversion efficiency, several difficulties of running into instability of the locking have been encountered for a system including plural external resonators.

In addition, in order to increase wavelength conversion efficiency or to obtain a high-power wavelength converted light, a high-power laser light has to irradiate external resonators to implement the wavelength conversion of the laser light. Although this irradiation is carried out by letting the high power laser light to be incident on a phase-modulator, the intensity of the incident laser light can be increased only to a certain limit of damage for the phase-modulator because of possible damaging effects by the laser light irradiation. The damages may be avoided by using the phase-modulator provided with components having a large effective diameter. However, this takes an optical crystal (nonlinear optical element) in the phase-modulator to be increased in size and accordingly in its costs. Therefore, it is highly desirable to be able to carry out stable signal modulations utilizing low intensity laser light.

SUMMARY OF THE INVENTION

In view of the aforementioned difficulties, the purpose of the invention is to address stable locking of each of external resonators using a single modulation signal, which is carried out by generating desirable laser light in the external resonators according to FM sideband method.

In order to achieve the above objects, there provided according to one form of the invention is a laser light generating apparatus, including a laser light source, first and second external resonators and other plural resonators, a phase-modulator, a signal generating unit, first and second nonlinear optical elements, an optical path length varying unit, at least one photodetector, and a control circuit.

The second external resonator is disposed at the stage succeeding the first external resonator; the phase-modulator is configured to be applied with a modulation signal; the signal generating unit is configured to generate the modulation signal applied to the phase-modulator; and the first and second nonlinear optical elements, which are disposed in the first and second external resonators, respectively, are configured to implement the wavelength conversion of a laser light incident on each of the first and second external resonators. In addition, the optical path length varying unit is configured to vary the optical path length of each of the first and second external resonators, and the at least one photodetector is configured to receive the laser light emerging from each of the first and second external resonators. Still in addition, the control circuit having a negative feedback arrangement is configured to acquire at least one detection signal received by the at least one photodetector and the modulation signal, to thereby obtain an error signal for each of the first and second external resonators, and configured to control the optical path length varying unit using the error signal according to the FM sideband method.

By setting the frequency of the modulation signal to be equal to the value which is obtained so that S/N ratios of the error signal for each of the external resonators may be averaged, and by controlling optical path lengths of each of the external resonators by the control circuit, the external resonators are held simultaneously in a resonance state. As an example of the measures for averaging S/N ratios, the frequency of the modulation signal, which is applied to the phase-modulator, is set so as to maintain the product P of S/N ratios of the error signals for each of the external resonators to be approximately equal to its maximum value.

According to the abovementioned construction, since the laser light generating apparatus is formed, being configured to acquire error signals of external resonators at respective stages, and to set the frequency of the modulation signal applied to the phase-modulator to such a value that S/N ratios of error signals at the respective stages are averaged, the stable locking for all external resonators thereby will be feasible. Particularly, when the frequency of the modulation signal is set so that the product of S/N ratios of the error signals may be approximately equal to its maximum value, the plural external resonators can be stabilized as a whole.

In addition, the laser light generating apparatus is preferably provided with a modulation frequency setting unit for acquiring error signals, which are caused by the changes of transmission widths of the external resonators, and for setting the frequency of modulation signal applied to the phase-modulator to such a value that S/N ratios of the error signals for the external resonators are each averaged.

According to the abovementioned structure with the modulation frequency setting unit, the frequency of the modulation signal can be set in response to the change of transmission widths of the external resonators caused over time or by other factors, for example, so that S/N ratios of error signals for each of the external resonators may be averaged. As a result, the stable locking will be feasible even with respect to the changes in locking conditions caused over time.

According to one form of the invention, it is configured so that error signals of external resonators at respective stages may be detected for generating desirable laser light in plural external resonators according to the FM sideband method, and that the frequency of the modulation signal may be set to such a value that each of the S/N ratios of the error signals are averaged for respective external resonators. Therefore, the stable locking will be feasible for each external resonator using the single modulation signal.

BRIEF DESCRIPTION OF THE VIEWS

Figure 1:
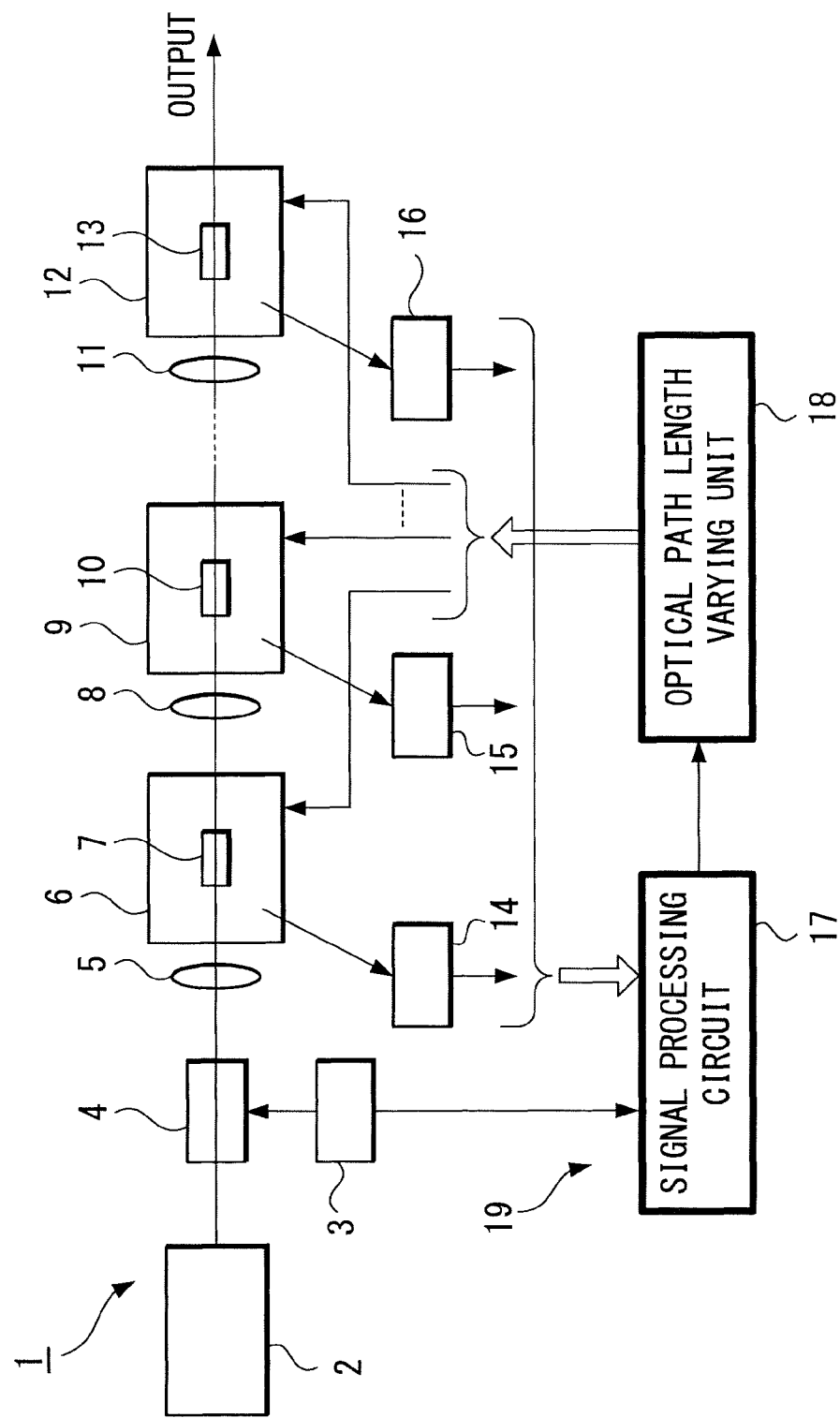
FIG. 1 is a view schematically illustrating a fundamental configuration of a laser light generating apparatus according to the invention.
Figure 9A:
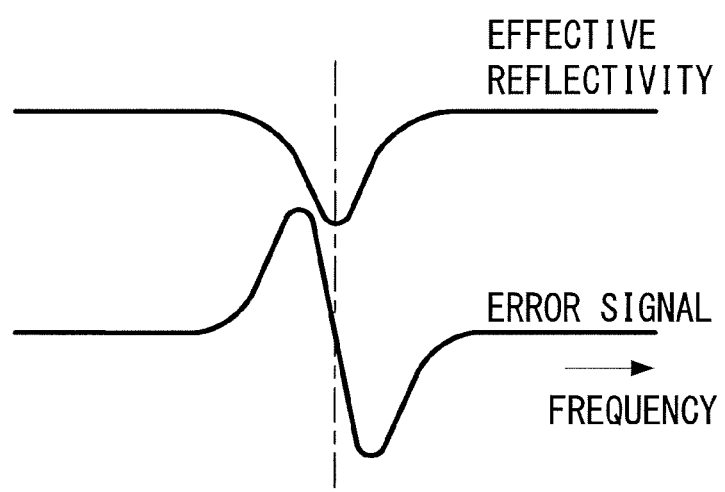
Figure 9B:
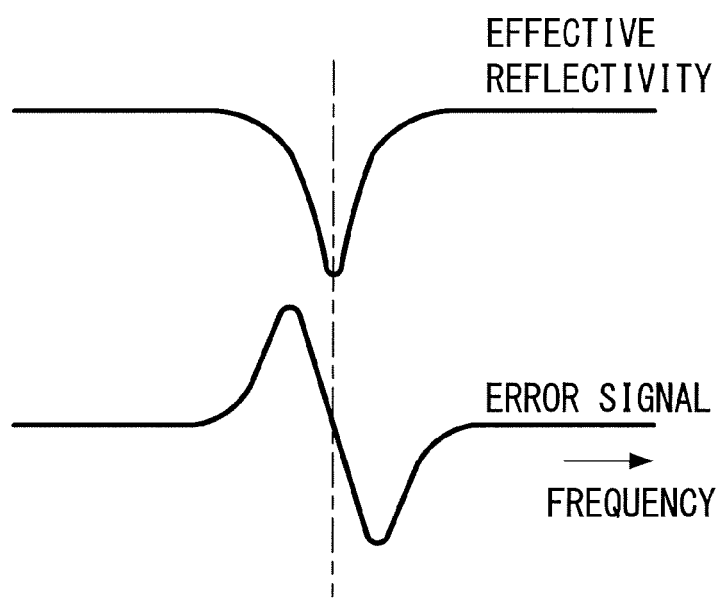
Figure 9C:
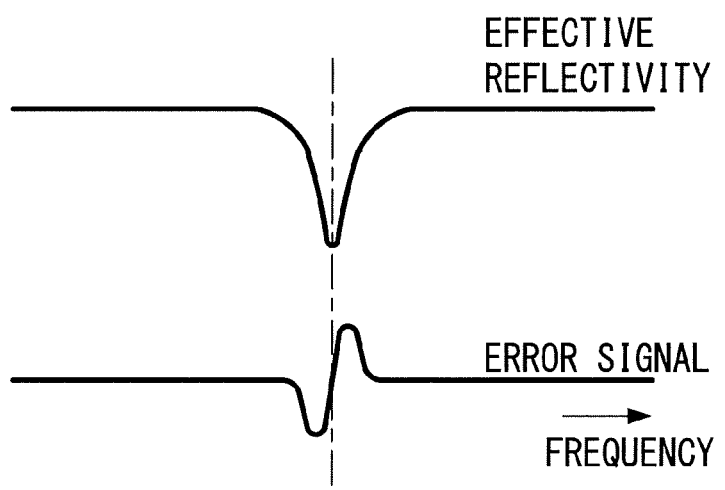
Figure 10:
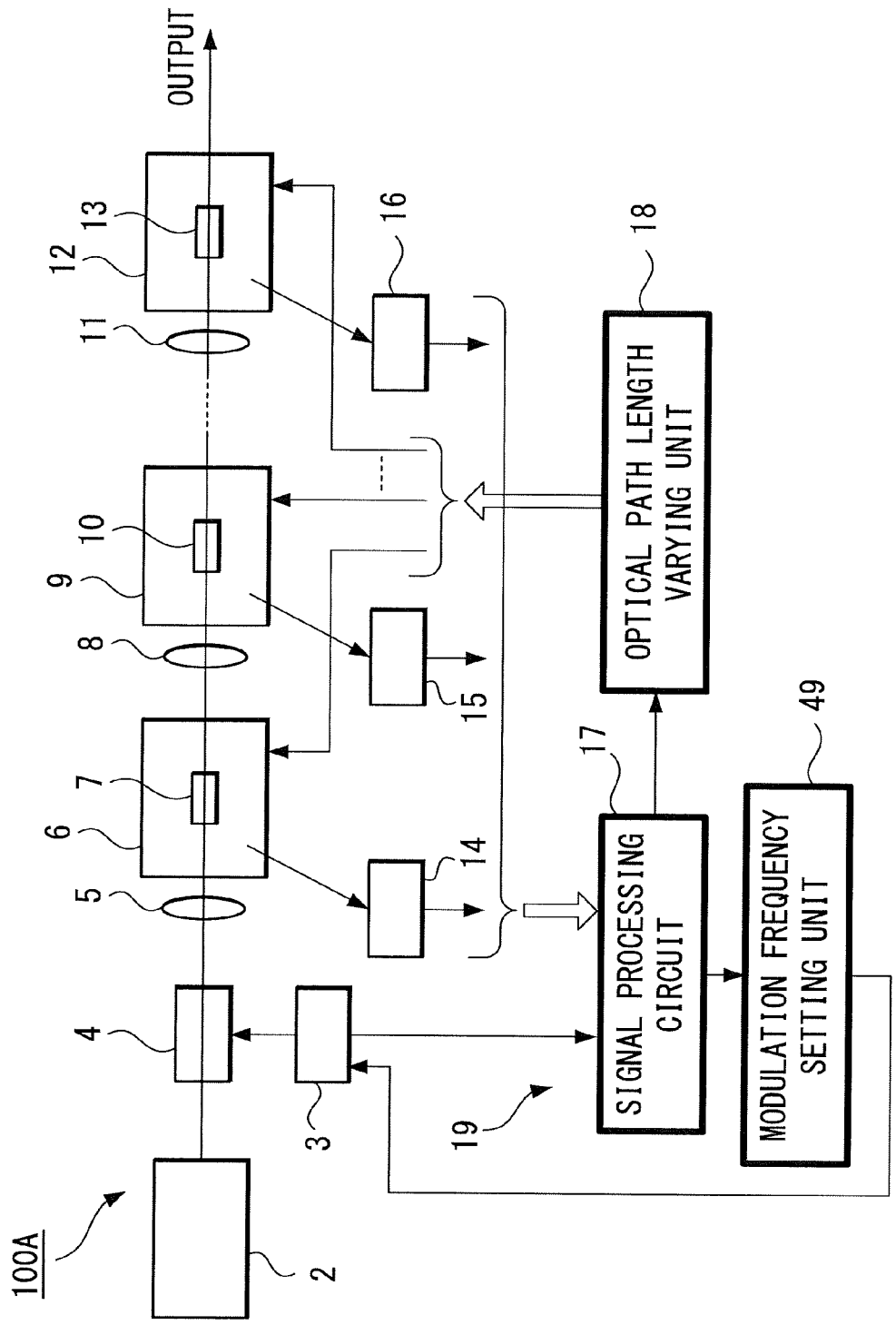
Figure 11:
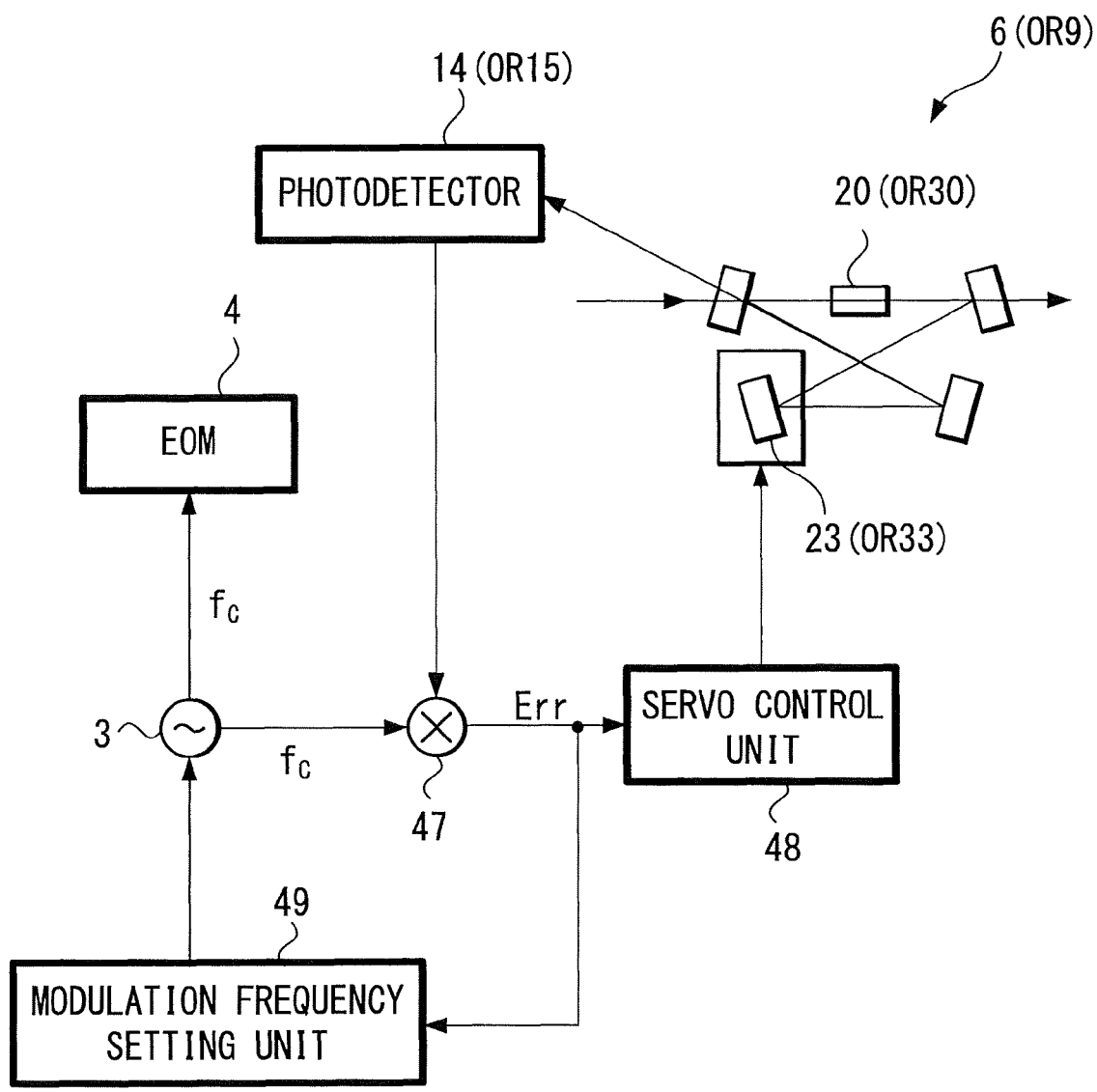
Figure 12:
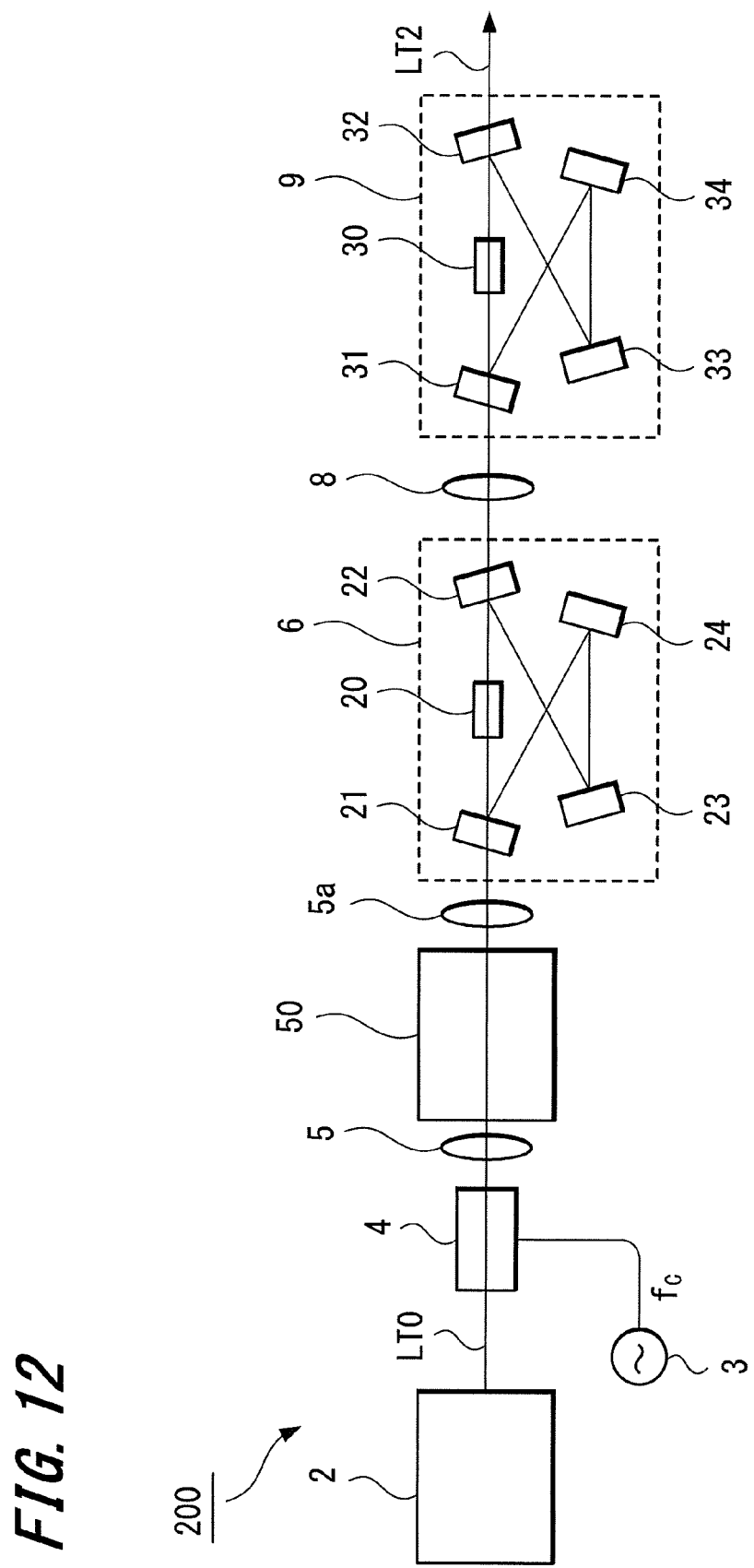
Figure 13:
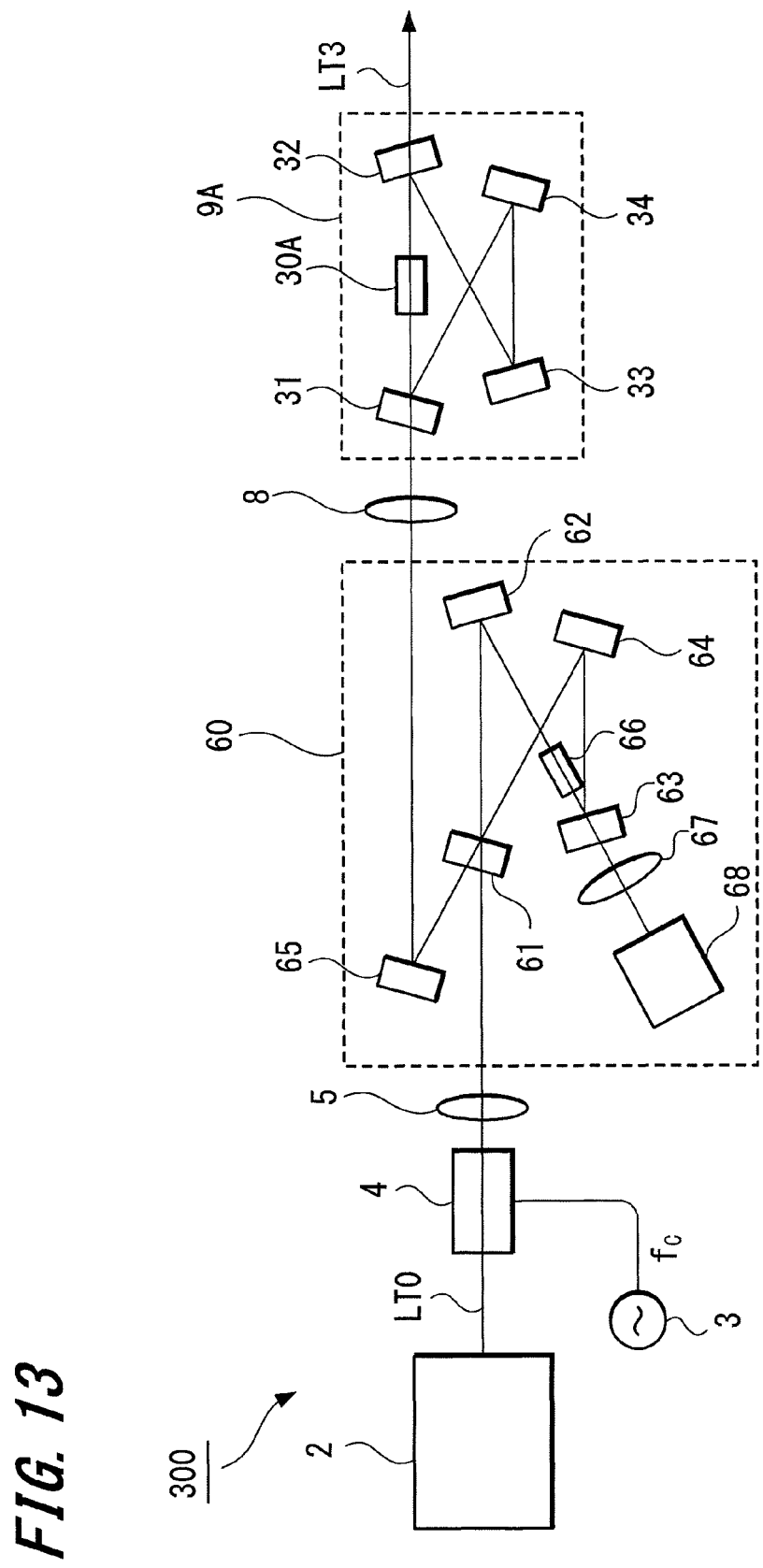
Figure 14:
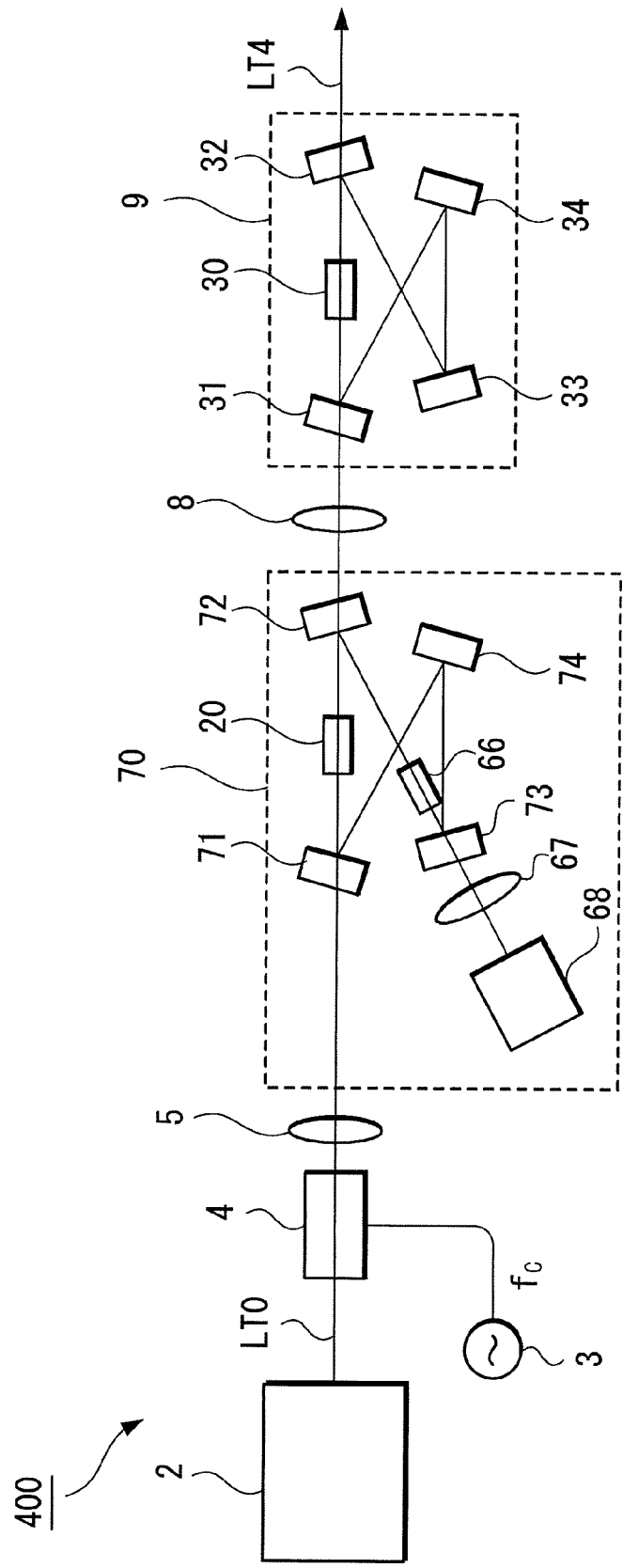
Figure 15:
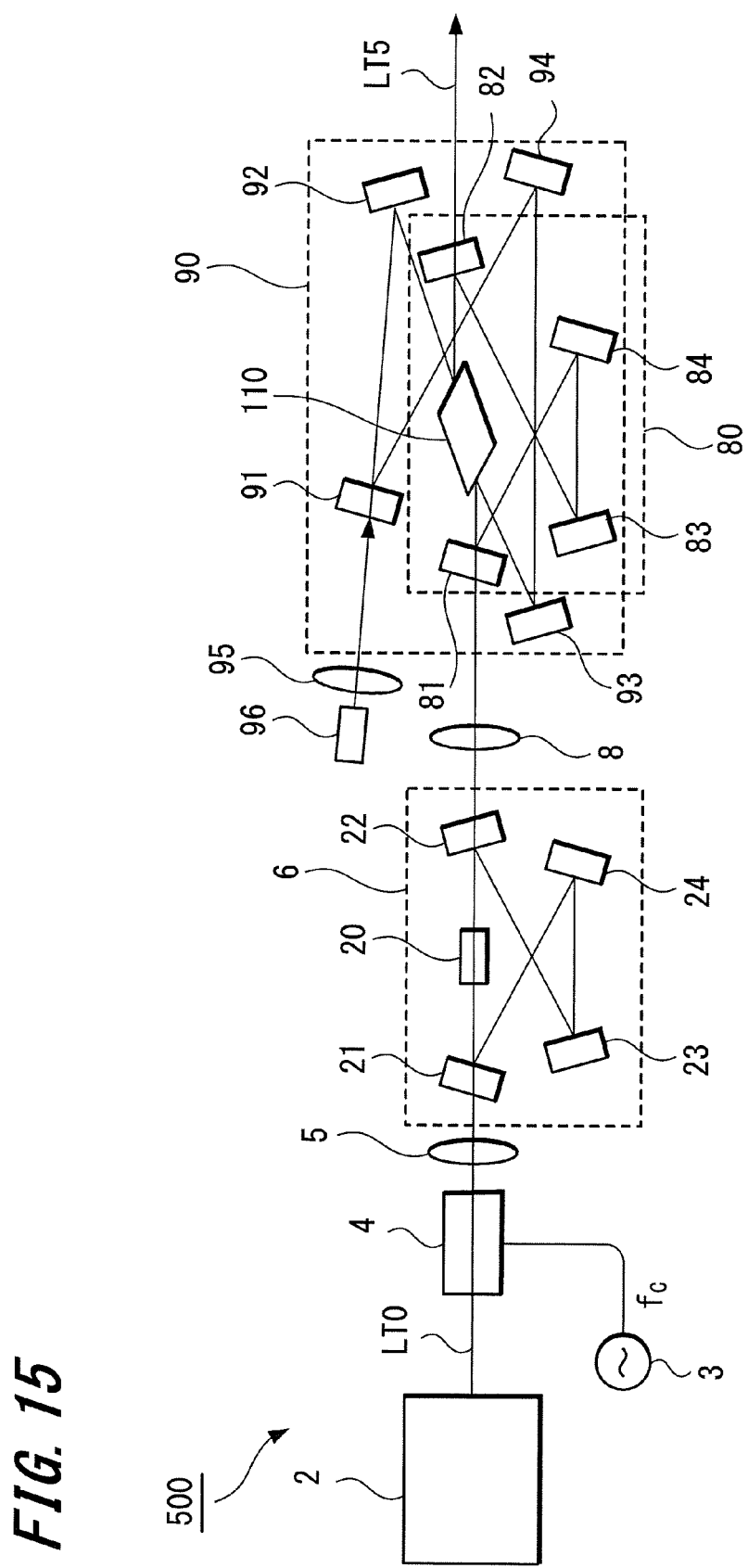

FIGS. 9A, 9B, and 9C are graphical plots each illustrating the correlation between the effective reflectivity and error signals at locking for three stage resonators;

FIG. 10 is a view illustrating a modification to the embodiment shown in FIG. 1;

FIG. 11 is a view illustrating the fundamental configuration of a further control system including the phase-modulator and the photodetector;

FIG. 12 is a view schematically illustrating a laser light generating apparatus according to a second embodiment of the invention;

FIG. 13 is a view schematically illustrating a laser light generating apparatus according to a third embodiment of the invention;

FIG. 14 is a view schematically illustrating a laser light generating apparatus according to a fourth embodiment of the invention; and FIG. 15 is a view schematically illustrating a laser light generating apparatus according to a fifth embodiment of the invention.

DESCRIPTION OF THE PREFERRED EMBODIMENTS

The invention relates to a laser light generating apparatus including a laser light source having the continuous-wave (CW) emission capability and a plurality of external resonators, which is suitable for carrying out the wavelength conversion over multiple stages, for example. Referring now to the drawings, there shown by the way of examples are several embodiments of the invention.

First Embodiment

A laser light generating apparatus is described hereinbelow in reference to FIGS. 1 through 9 according to a first embodiment of the invention. FIG. 1 is a view conceptually illustrating a fundamental configuration of the embodiment.

Referring to FIG. 1, the laser light generating apparatus 1 includes at least a laser light source 2 for outputting laser light of substantially a single frequency. Laser light output from the laser light source 2 passes through a phase-modulator 4, an optical system 5, and subsequently passes through a plurality of external resonators 6 to 12. In addition, the phase-modulator 4 is provided with a signal generating unit 3 (having a local oscillator for generating an oscillation signal) for generating a modulation signal to be applied to the phase-modulator 4. The optical system 5 may optionally include a lens, a prism, a mirror and other similar elements for mode matching, and other components, such as a dichroic mirror, an absorption filter and others for selecting and transmitting light to a resonator at the next stage.

The plurality of external resonators 6 to 12 are arranged end to end in a row, including a first external resonator and a second external resonator, which is disposed as the stage succeeding the first external resonator. In the following description on the apparatus, the external resonator 6 is taken as the first external resonator and the external resonator 9 is taken as the second external resonator.

It should be noted that the first external resonator may not be limited to the external resonator 6 at the first stage, and that any external resonator may serve as the first external resonator. Similarly, the second external resonator may not be limited to the external resonator 9 at the second stage, and any external resonator may serve as the second external resonator, insofar as the external resonator is placed at the stage succeeding the first external resonator. In addition, it is desirable for this configuration of the apparatus that one phase-modulator, i.e., the phase-modulator 4 in this example, is placed on the beam path between the laser light source 2 and the first external resonator, and that the light output from the first external resonator is incident on the second external resonator without the influence of phase modulation by the phase-modulator 4.

Several nonlinear optical elements (or nonlinear optical crystals) 7 to 13 are disposed in the interior of the external resonators 6 to 12, respectively. As the nonlinear optical elements, those capable of implementing wavelength conversions involving second harmonic light generation, sum frequency generation and the like are recited. Laser media having gain amplification capabilities in place of the nonlinear optical elements may alternatively be provided in the interior of each of the external resonators.

At least the first external resonator 6 and the second external resonator 9 among other external resonators are provided with an optical path length varying unit 18 for varying optical path length of each of first and second external resonators. The optical path length varying unit 18 is configured to carry out several controls such as a servo-control of the position and attitude of a compositional elements (mirrors and other optical elements) included in the external resonator using an actuator such as a VCM (voice coil motor), a piezoelectric element and the like; and the control of optical characteristics (such as an index of refraction and other similar parameters) by applying a voltage or the like to optical crystals.

Several optical systems 5 to 11 for mode matching are disposed between the laser light source 2 and the first external resonator and also between neighboring external resonators, to couple necessary light efficiently among the laser light source 2, and these resonators.

Photodetectors 14 to 16 are provided to receive light emerging from the external resonators 7 to 13, respectively. These photodetectors are each formed of photodiodes and the like, which are capable of converting the light detected by the detectors into electric signals. Although two types of the photodetector are typically cited, the one detecting the light reflected from the external resonator and the other detecting the light transmitted through, the former is preferable in this example from the viewpoint of magnitude of detection signals.

A signal processing circuit 17 is configured to acquire detection signals output by each of the photodetectors 14 to 16 and a modulation signal (oscillation signal of a predetermined frequency) generated by the signal generating unit 3, to perform synchronous detection based on the detection signals and the modulation signal to thereby obtain error signals, and to output thus obtained error signals to the optical path length varying unit 18. Namely, a control circuit 19 is now formed having a negative feedback arrangement, including the signal processing circuit 17 for obtaining error signals and the optical path length varying unit 18 for varying circular optical path length of the external resonator according to the FM sideband method.

In this configuration, laser light emitted from the laser light source 2 enters the phase-modulator 4, to which the modulation signal generated by the signal generating unit 3 is applied, thereby being subjected to phase modulation at the predetermined frequency. Following the phase modulation, the laser light passes through the optical system 5 and enters the first external resonator 6. In addition, light generated by the nonlinear optical element 7 included in the first external resonator 6 is incident on the second external resonator 9.

The light (either reflected light or transmitted light) emerging from the first external resonator 6 and the second external resonator 9 is detected by the photodetectors 14 and 15, respectively. Subsequently, based on an error signal obtained through detection process with the signal processing circuit 17, the optical path length varying unit 18 controls the optical path length (i.e., circular optical path length) for each of external resonators to be equal to an integral multiple of the laser wavelength. That is, the optical path length of each of external resonators is variably controlled so that the error signal will be zero. The plurality of external resonators 6 to 12 are thereby held simultaneously in a resonant state (so-called locked state).

Figure 2:
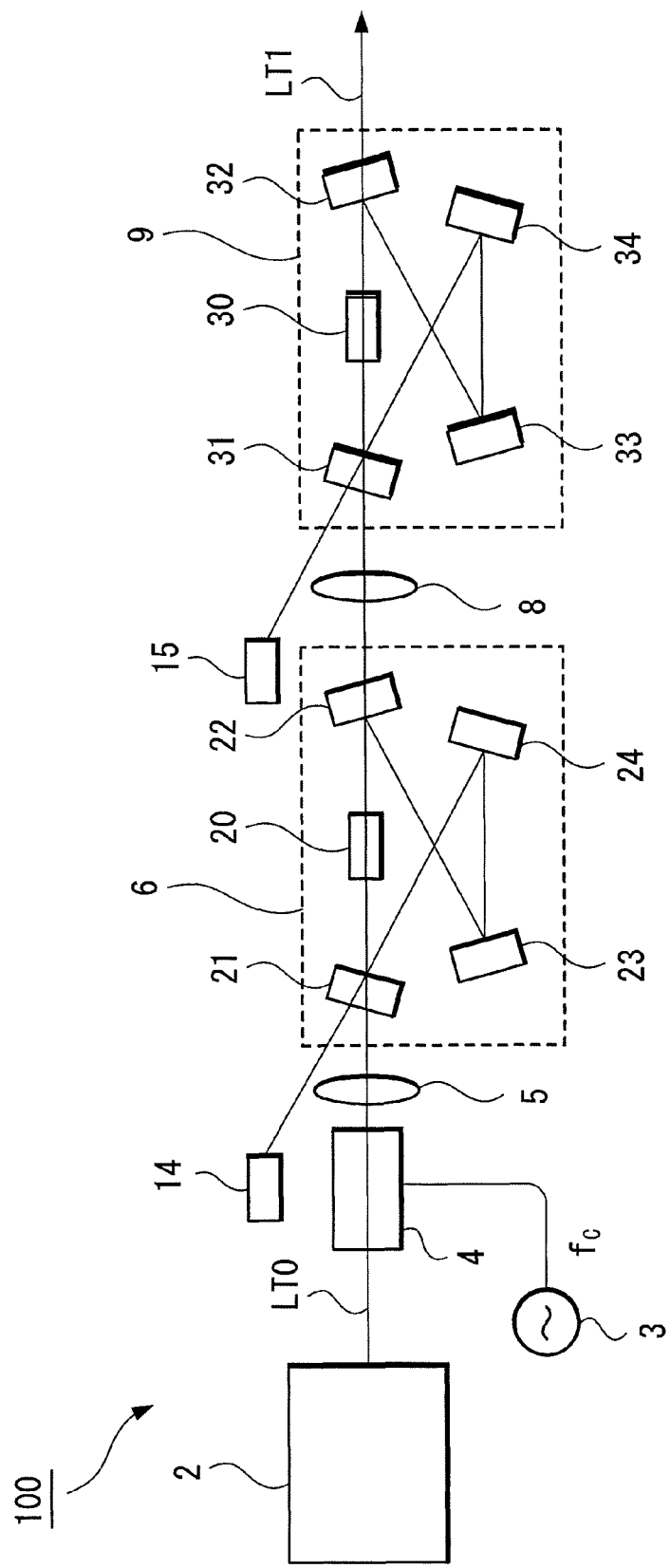
FIG. 2 is a view schematically illustrating a laser light generating apparatus according to a first embodiment of the invention.

FIG. 2 is a view illustrating a laser light generating apparatus 100 configured to lock simultaneously the external resonators 6 and 9 at two stages using a single phase-modulator 4 according to the FM sideband method. The laser light generating apparatus 100 is illustrated in FIG. 2 with the abbreviation of several components shown in FIG. 1, such as photodetectors 14 to 16, the signal processing circuit 17, and the optical path length varying unit 18. The components and units similar to those shown in FIG. 1 are shown by identical numerals and the repeated description thereof is herewith omitted.

According to the first embodiment of the invention, a laser light source 2 is used for outputting infrared light (at the wavelength $\lambda=1064$ nm, for example) in a longitudinal single mode. The output light LT0 passes through the single phase-modulator 4. Since the phase-modulator 4 is supplied with a high frequency signal as the modulation signal having a single frequency fc, which is generated by the signal generating unit 3 indicated with the signal source mark in the drawing, the light passes through the phase-modulator 4 is subjected to the phase modulation at the frequency fc.

Figure 3:
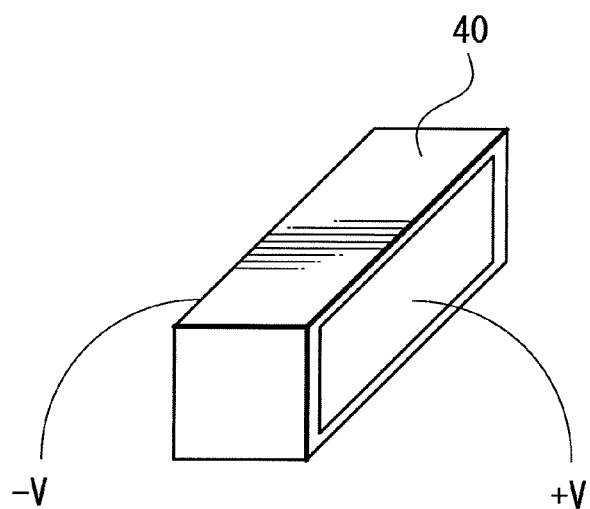
FIG. 3 is a view diagrammatically illustrating a phase-modulator operable in the bipolar driving mode.

Some of modulated signals outputted from the signal generating unit 3 according to the first embodiment of the invention are used as local oscillation signals for demodulating the error signals by the signal processing circuit 17 (FIG. 1), in which these error signals are obtained by the external resonators including the first external resonator 6 and the second external resonator 9. In order to ensure sufficiently large S/N ratios of the error signals for the external resonator at the final stage (the external resonator 12 in FIG. 1, for example), it is an effective measure to operate the phase-modulator in a bipolar driving mode as shown in FIG. 3.

Figure 4:
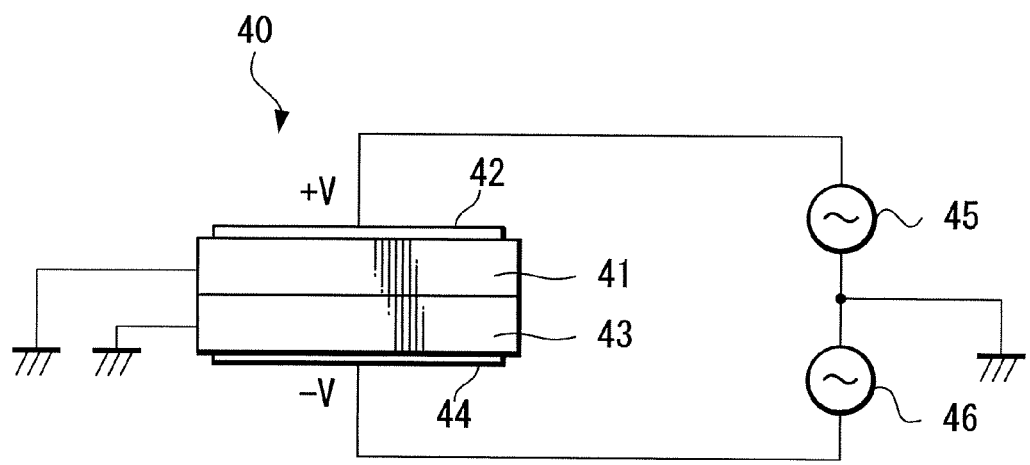
FIG. 4 is a view illustrating an exemplary circuit of the bipolar-driven phase-modulator of FIG. 3.

FIG. 4 is a view illustrating an exemplary circuit of the bipolar-driven phase-modulator. As shown in FIG. 4, the phase-modulator 40 is formed by combining first and second phase-modulators electrically isolated each other.

Referring again to FIG. 4, the one end of each of first and second power supply units, 45 and 46, which is each configured to generate a prescribed driving voltage V (V=$V_0$ sin (2fc·t+$\Phi_0$), for example), is grounded. In addition, the other end of the first power supply unit 45 is connected to the electrode 42 of the first phase-modulator, and the other end of the second power supply unit 46 is connected to the electrode 44 of the second phase-modulator (i.e., the electrode disposed on the face opposing to the electrode 42).

Further, there combined as being in contact with each other are the other electrode 41 of the first phase-modulator and the other electrode 43 of the second phase-modulator, in which these electrodes, 41 and 43, are each grounded. The inter-electrode distance of each of the first and second phase-modulators is adjusted to be one-half of the inter-electrode distance of the single standard phase-modulator (i.e., d/2). As a result, in the phase-modulator 40 which is formed as the combination of the first and second phase-modulators, the inter-electrode distance between these electrodes, 41 and 43, is brought to be equal to the distance d of the single standard phase-modulator.

It is assumed that the voltage signal V is supplied by power supply units, 45 and 46, and that two voltage signals, +V and −V, are respectively applied to both electrodes, 42 and 44, of the phase-modulator 40, with the ground potential intervened therebetween, in which the two voltage signals are opposed to each other in polarity and the same in phase. Consequently, the potential difference 2V always arises between the electrodes, 42 and 44, of the phase-modulator 40, and an electric field of twice the ordinary field is generated. As a result, the S/N ratio of the error signals increases.

It is noted regarding power supply units, 45 and 46, illustrated in FIG. 4, that another circuit may alternatively be formed including a single voltage signal supply source (not shown), which is configured to generate voltage signals having the polarity opposite to each other and the same in phase, to be supplied subsequently to the phase-modulator 40.

Referring again to FIG. 2, the laser light transmitted through the phase-modulator 4 enters the first external resonator 6 via the optical systems 5. In this case, the incident light is assumed to match suitably with the unique mode assigned to the first external resonator 6 (i.e., so-called mode-matching).

The first external resonator 6 is formed, optionally including an entrance mirror 21, a plurality of mirrors 22, 23, and 24, and a nonlinear optical element 20. Namely, as shown in FIG. 2, the entrance mirror 21 and the exit mirror 22 are placed on the main optical path, and the nonlinear optical element 20 is placed between the entrance mirror 21 and the exit mirror 22. In addition, the mirror 23 is placed on the side of the mirror 21, while the mirror 24 is placed on the side of the mirror 22. The laser light previously entered the mirror 21 passes through the nonlinear optical element 20, reflected by the mirrors 22, 23, and 24 in that order, and subsequently returned to the 21, thereby forming the external resonator 6. The entrance mirror 21 is provided, preferably having the reflectivity optimized for achieving the impedance matching.

According to the first embodiment of the invention, the materials for use in the nonlinear optical element 20 include a crystal suitably phase-matched for second-harmonic generation (SHG) and another crystal which is phase-matched by the method of periodical poling or other similar methods. In this case of SHG, the wavelength ($\lambda$=1064 nm, for example) of fundamental wave of the light emitted from the laser light source 2 can be converted into half of that wavelength (i.e., $\lambda$=532 nm).

The length of the circular optical path of the external resonator 6 can be variably controlled by varying the position and attitude of at least one of the mirrors in the first external resonator 6 with a moving device such as a VCM (voice coil motor), a stepping motor or the like, or with a driving device utilizing the piezoelectric effect of PZT or the like. As a further method for variably controlling the length of the circular optical path of the external resonator 6, several optical elements such as a prism, a grating or the like may be suitably displaced in place of the mirror. Also, there is a still further method such as varying the length of the circular optical path by applying a voltage to a nonlinear optical element or an electro-optical crystal.

Part of the light reflected by the mirror 24 in the first external resonator 6 passes through the mirror 21, is received by the photodetector 14, and is subjected to signal detection.

Since the first external resonator 6 is also provided with the nonlinear optical element 20, the light output resulted from efficient wavelength conversion is subsequently led to enter the second external resonator 9 via the optical system 8 for mode matching. The light output from the first external resonator 6 may optionally be separated from that without wavelength conversion by a wavelength separation mirror (not shown).

In similar manner to the first external resonator 6, the second external resonator 9 includes an entrance mirror 31, a plurality of mirrors 32, 33, and 34 and a nonlinear optical element 30. Namely, as shown in FIG. 2, the entrance mirror 31 and the exit mirror 32 are placed on the main optical path, and the nonlinear optical element 30 is placed between the entrance mirror 31 and the exit mirror 32. In addition, the mirror 33 is placed on the side of the mirror 31, and the mirror 34 is placed on the side of the mirror 32. The laser light previously entered the mirror 31 via the optical system 8 passes through the nonlinear optical element 30, is reflected by the mirrors 32, 33, and 34 in that order, and is subsequently returned to the 31, thereby forming the external resonator 9. The entrance mirror 31 is provided, preferably having the reflectivity optimized for achieving impedance matching.

According to the first embodiment of the invention, the materials for use in the nonlinear optical element 30 include a crystal suitably phase-matched for second-harmonic generation and a further crystal which is phase-matched by periodically poling. In this case, the wavelength ($\lambda$=532 nm, for example) of fundamental wave of the light output from the first external resonator 6 can be converted into half of that wavelength ($\lambda$=266 nm, for example).

Also in similar manner to the first external resonator 6, the length of the circular optical path of the external resonator 9 is configured to be capable of variably controlled by changing the position and attitude of at least one of the mirrors for forming the first external resonator 9 with a moving device such as a VCM (voice coil motor), a stepping motor or the like, or with a driving device utilizing the piezoelectric phenomenon of PZT or the like.

Part of the light reflected by the mirror 34 in the second external resonator 9 pass through the mirror 31, is received by the photodetector 15, and is subjected to the signal detection.

In addition, the light outputted following the efficient wavelength conversion with the nonlinear optical element 30, passes through the mirror 32, and subsequently exits to the exterior as a light output LT1.

As described above, the nonlinear optical element 20, which is capable of converting the wavelength of laser light incident on the first external resonator 6, is placed on the main optical path, and the light output subsequent to the efficient wavelength conversion is incident on the second external resonator 9 via the optical system. In the similar manner to the first external resonator 6, the second external resonator 9 is locked according to the FM sideband method, and the light output is obtained following the wavelength conversion implemented by nonlinear optical element 30.

Figure 5:
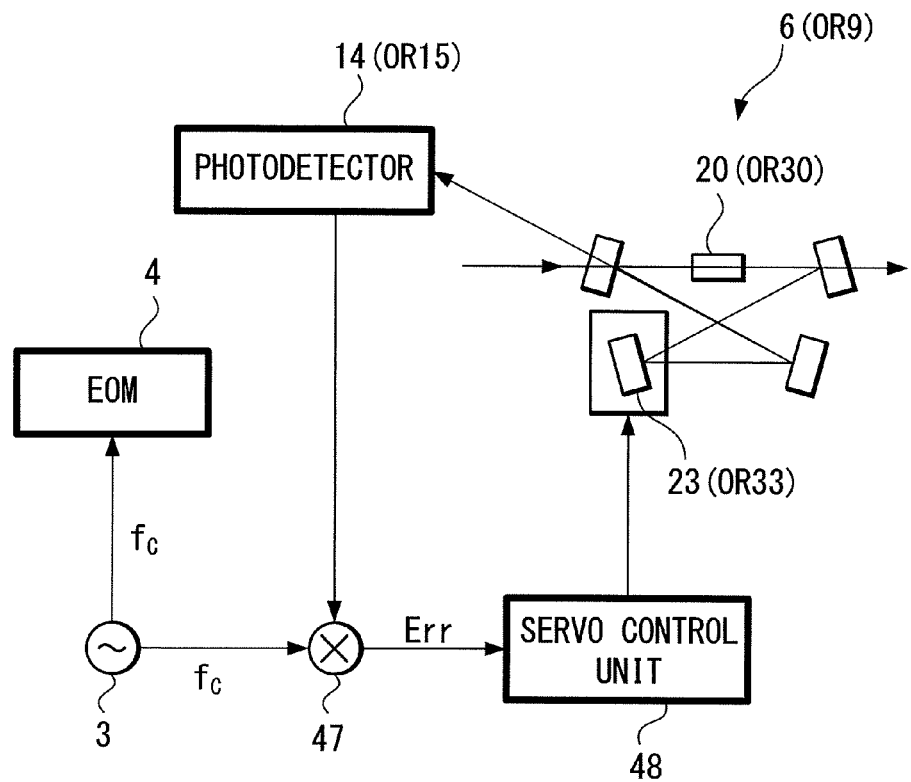
FIG. 5 is a view illustrating the fundamental configuration of a control system including the phase-modulator and the photodetector.

FIG. 5 is a view illustrating the fundamental configuration of a control system including the phase-modulator and the photodetector. Since the first and second external resonators are similar in the circuit arrangement, the parts and components common to both of the external resonators are shown in FIG. 5 with corresponding numerals side by side.

As described above, the modulation signal having the frequency fc is generated by the signal generating unit 3, and subsequently applied to the phase-modulator 4 (shown as "EOM (electro-optic modulator)" in the drawing), to thereby subject the laser light to the phase modulation.

Both of at least one detection signal, which is generated by the light reflected from the first external resonator 6 and from the second external resonator 9 and detected by the photodetector (such as the photodetector 14 for the first external resonator 6 and the photodetector 15 for the second external resonator 6, both shown in FIG. 5), and the modulation signal as local oscillation signal (high frequency signal with the frequency fc) are supplied to a detection unit 47 (indicated as a multiplier in FIG. 5) for implementing the synchronous detection. An error signal (indicated as "Err") obtained as above by the synchronous detection is supplied to a servo control unit 48. Although not shown in the drawing, it is noted herein that the so-called "pull-in" circuit may additionally be provided to determine whether to implement locking or not based on the signal from a total light-amount monitor.

The servo control unit 48 generates control signals so that the level of the error signal Err will be zero, and then controls the optical path length (circular optical path length) of the external resonator to be equal to an integral multiple of the laser wavelength using the control signals. Namely, in the example of FIG. 2, the abovementioned control is achieved by controlling the position and attitude of the mirrors, 23 and 33, in the first and second external resonators 6 and 9 respectively.

Since a known mechanism may be used for a moving mechanism, a driving control circuit or the like for the mirrors, a further description thereof is herein omitted. In addition, fundamental elements for the processing only are shown herein, and it is noted some of the circuitry for signal processing such as a filtering circuit for extracting high-frequency signals from the detection signals after receiving the light, for example, are not shown in the drawing (this may alternatively be included in the photodetector or other similar device).

Each of the external resonators is in the condition of both mode matching and impedance matching, simultaneously, and it is noticeable that the resonance in the resonators occurs at a certain optical path length (i.e., first optical path length) and then at another optical path length which is increased from the first optical path length by one laser wavelength or the multiple thereof.

When the optical path length varying unit 18 is subjected to sweep (i.e., change the circular optical path length) at least in the vicinity of the spatial conditions well adjusted for each of external resonators, several regions emerge periodically, in which light reflection from the external resonators decreases owning to the resonance.

As to the light reflection, an effective reflectivity $R(\delta)$ is given by the following equation (1), where $\lambda$ stands for the wavelength of laser light, L for the circular optical path length of external resonator, $\delta$ for the phase delay for laser light on the circular optical path in the external resonator, $R_1$ for the reflectively of the mirror to which laser light is rendered incident from the exterior (mirror 21, for example), $R_j$ for reflectively of the j-th mirror in the external resonator, and $T_j$ for the transmittance (including linear and nonlinear loss by nonlinear optical element) of the j-th built-in optical element other than the mirror.

$$R(\delta) = \frac{\left(\sqrt{R_1} - \sqrt{R_m}\right)^2 + 4\sqrt{R_1 R_m}\sin^2(\delta/2)}{\left(1 - \sqrt{R_1 R_m}\right)^2 + 4\sqrt{R_1 R_m}\sin^2(\delta/2)} \quad (1)$$

wherein $$\delta = \frac{2\pi L}{\lambda}$$

$$R_m = R_2 R_3 \ldots \times T_1 T_2 \ldots$$

Since the fundamental wave component resulted from the wavelength conversion has a certain contribution to the abovementioned loss, the efficiency of wavelength conversion has to be included also for computing the composite reflectivity $R_m$ (William Kozlovsky et al., IEEE Journal of Quantum Electronics, Vol. 24, No. 6, page 913 (1988)). As descried above, the composite reflectivity $R_m$ is defined as the circular transmittance excluding the entrance mirror (i.e., the product of reflection factors for each of mirrors other than the entrance mirror multiplied by the product of transmittance factors for each optical element on the optical path of laser light inside the external resonator). It is assumed according to the first embodiment of the invention that the coefficient of spatial mode matching between the incident light and the resonator mode (i.e., mode matching) approximates to 1 (one). When the relation $R_1 = R_m$ holds, the condition of impedance matching (or matching) is achieved.

Figure 6:
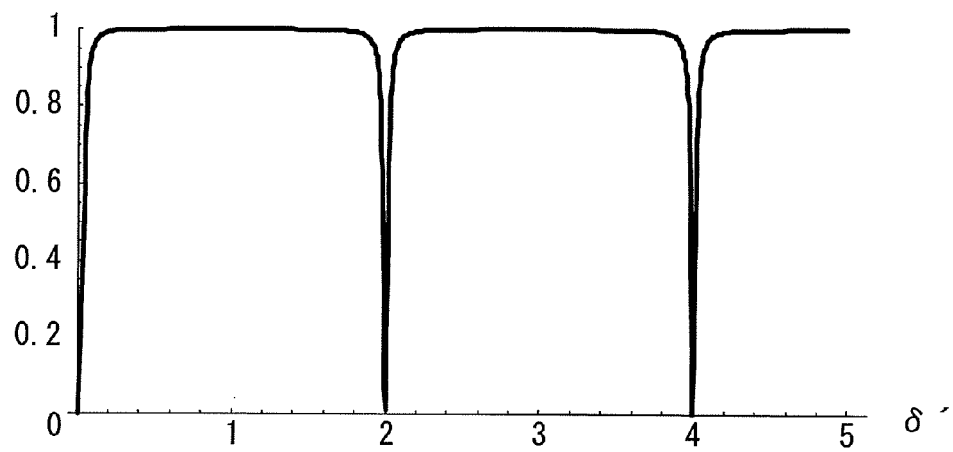
FIG. 6 is a graph illustrating effective reflection characteristics of the external resonators.

FIG. 6 is a graph illustrating effective reflection characteristics of the external resonators, represented as the change of effective reflectivity $R(\delta)$ when the circular optical path length L is subjected to the sweep operation, which is expressed by the amount of phase delay $\delta$. Since the phase delay $\delta$ is intrinsically large in magnitude as seen from the equation (1), there used for reasons of simplicity is the parameter $\delta'$ obtained by subtracting an integral multiple of $2\pi$ from the phase delay $\delta$. Accordingly, FIG. 6 plots the effective reflectivity $R(\delta)$, vertically, versus the phase delay $\delta'$, horizontally. Incidentally, since it is relatively easy under normal circumstances to maintain the spatial mode matching coefficient $\eta_m$ between the incident light and the resonator mode to be in the range of from 70 to 95%, this coefficient is approximated herein as $\eta_m = 1$. Also for reasons of simplicity, it is assumed that an impedance matching is achieved for the resonator, and that the relation $R_1 = R_m = 0.95$ (95%) holds.

As is clear from the fact that the terms of sine function $\sin(\delta/2)$ squared are included in the equation (1), apparent reflectivity (effective reflectivity) of the external resonator decreases drastically for $\delta' = p \cdot \pi$ (p being an even number), and almost all the incident light enters the external resonator, thus increasing the intensity of light on the circular optical path inside the external resonator. This is referred to as "resonance state", and maintaining this resonance state is referred to as "locking".

It is preferable that the circular optical path length be maintained to satisfy the condition represented by the relation, $\delta'=2\cdot\pi\cdot L/\lambda=p\cdot\pi$, against external disturbances such as vibrations and temperature changes, and a unit for variably controlling the circular optical path length L may be necessary. This unit may suitably be provided either by changing the location or the like of the mirrors (mirrors, 23 and 33, in FIG. 2, for example) or the nonlinear optical element, or by varying the index of refraction or similar other parameters using an electro-optical element.

Figure 7A:
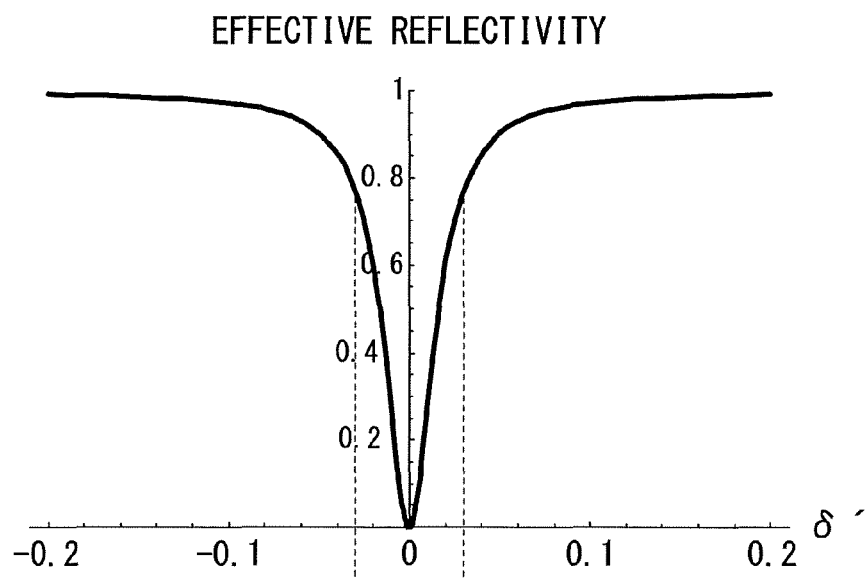
FIGS. 7A and 7B are views illustrating the relation between the effective reflection characteristics of the external resonator and modulation frequencies.
Figure 7B:
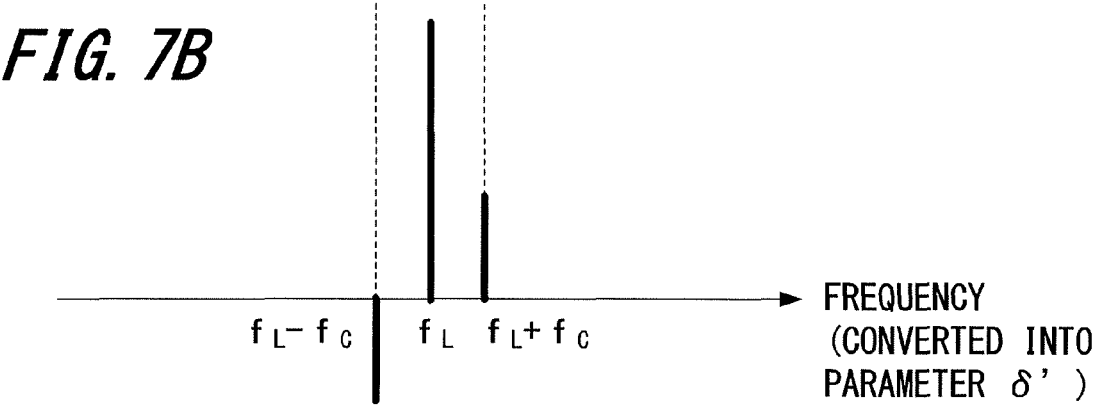

FIGS. 7A and 7B are views illustrating the relation between effective reflection characteristics of the external resonator 6 and modulation frequencies, in which FIG. 7A is an enlarged view of the portion in the vicinity of $\delta'=0$ in FIG. 6 for the effective reflection characteristics of the first external resonator 6, and FIG. 7B is a view graphically illustrating the spectral intensity of the light incident on the resonator 6, vertically, versus the frequency, horizontally, in terms of the frequency difference (differences in frequency from the frequency of light $f_L$) converted into the parameter $\delta'$.

The degrees of correspondence of the sideband frequency with phase delay $\delta'$ are generally given by the relation $f_c=c\delta'/(2\pi L)$, where c is the speed of light in vacuum. For reasons of convenience in description, the frequency $f_L$ of incident light is shown at the center of transmission ranges for the external resonators, and this corresponds to the case of correct locking. There shown herein are only a sum frequency and a difference frequency, which are resulted from the frequency of incident light $f_L$ and the modulation frequency $f_c$. It is indicated from the drawing that by suitably selecting the frequency of the signal from the signal generating unit 3 (local oscillator) for use in synchronous detection, the modulation frequency $f_c$ can be selected as desired so as to include modulated light in the transmission range.

The periodic decrease in the phase delay $\delta'$ takes place, and is repeated with the period of an integral multiple of $2\pi$. Upon the decrease, the intensity of reflected light will be minimal and almost all the incident light enters the first external resonator 6. For the phase delay $\delta'$ of $\pm 0.2\pi$, for example, the reflectivity is 99.3% (i.e., 0.7% transmission); while for $\pm 0.03\pi$, the reflectivity decreases approximately to 77% (23% transmission). In the example shown in FIG. 7A, the range of phase delay $\delta'$, which is defined by 50% intensity of the peak effective reflectivity, that is, full width at half height $\delta'_{0.5}$ (hereinafter referred to as "transmission width") is approximately $0.033\pi$. Incidentally, this transmission width $\delta'_{0.5}$ may be obtained alternatively from the $\delta'$ value measured at the half peak height of an effective transmission curve.

As mentioned above, since the effective reflectivity of the first external resonator 6 decreases when locked, most of the incident light enters the first external resonator 6. Assuming that the nonlinear optical element 20 utilizes an optical crystal for second-harmonic generation, for example, and that the light is generated at half the fundamental wavelength, phase modulated components also enter the inside of the first external resonator 6 in a relatively high proportion, and are subsequently subjected to wavelength conversion.

In this case, the frequency of incident light $f_L$ interferes with the modulation frequency $f_c$, and sidebands are generated around the frequency $f_L$ having the frequency of $f_L \pm f_c$, as a result. If these frequencies are those having relatively high reflectivity in the second external resonator 9, the reflected light with the sideband components can be extracted from the second external resonator 9 and error signals are obtained from the reflected light. Specifically, the modulation frequency $f_c$ is so selected that the "$f_L \pm f_c$" components of light nearly pass through the first external resonator 6, and simultaneously that these components are reflected by the second external resonator 9. Accordingly, this modulation frequency $f_c$ can be utilized for locking the second external resonator 9.

Therefore, there is provided the case where the abovementioned wavelength conversion is implemented on "the first wavelength" denoting the wavelength of the light emitted from the laser light source 2 and "the second wavelength" denoting the wavelength of the light generated by wavelength conversion with the nonlinear optical element 20 included in the first external resonator 6. Then, when the light having "the second wavelength" is rendered incident on the second external resonator 9, it will be feasible for the light having the first wavelength to serve as to obtain error signals utilizing some of reflected light having the first wavelength, and to lock the first external resonator 6 utilizing the error signals, and for the light having the second wavelength to serve as to obtain further error signals utilizing some of reflected light having the second wavelength, to lock the second external resonator 9 simultaneously with the first external resonator 6 utilizing the further error signals.

As described above, by providing the laser light source 2 with the external resonators 6 and 9, back to back at two stages, and by configuring to apply modulation signals to the phase-modulator 4, in which the modulation signal have the single frequency ($f_c$) component suitably selected for the resonance, each of external resonators can be maintained in the resonance state utilizing the FM sideband method.

Further, this resonance state is achieved with the phase-modulator 4 alone placed at preceding the single external resonators 6, thus circumventing the need of disposing plural phase-modulators each positioned at the stage preceding respective external resonators. In addition, It should be noted that the abovementioned selection of the suitable modulation frequency is carried out preferably provided that some of the sidebands included in the modulated light is reflected by the first external resonator 6, and that the other portion pass through the first external resonator 6 and subsequently reflected by the second external resonator 9 following the wavelength conversion.

In the FM sideband method, sidebands are first generated by modulating the laser light using the phase-modulator, and error signals are obtained from the sidebands included in the light reflected by the external resonator. Referring to FIG. 5, error signals (Err) are obtained by (a) sending light detection signals received by the photodetectors 14 and 15 to the detection unit 47, simultaneously supplying the signals having the same frequency as the modulation signal frequency fc from signal generating unit 3 (internal local oscillator) to the detection unit 47, and by (b) performing a synchronous phase detection of the detection signals and the signals sent from signal generating unit 3 using the detection unit 47.

Figure 8:
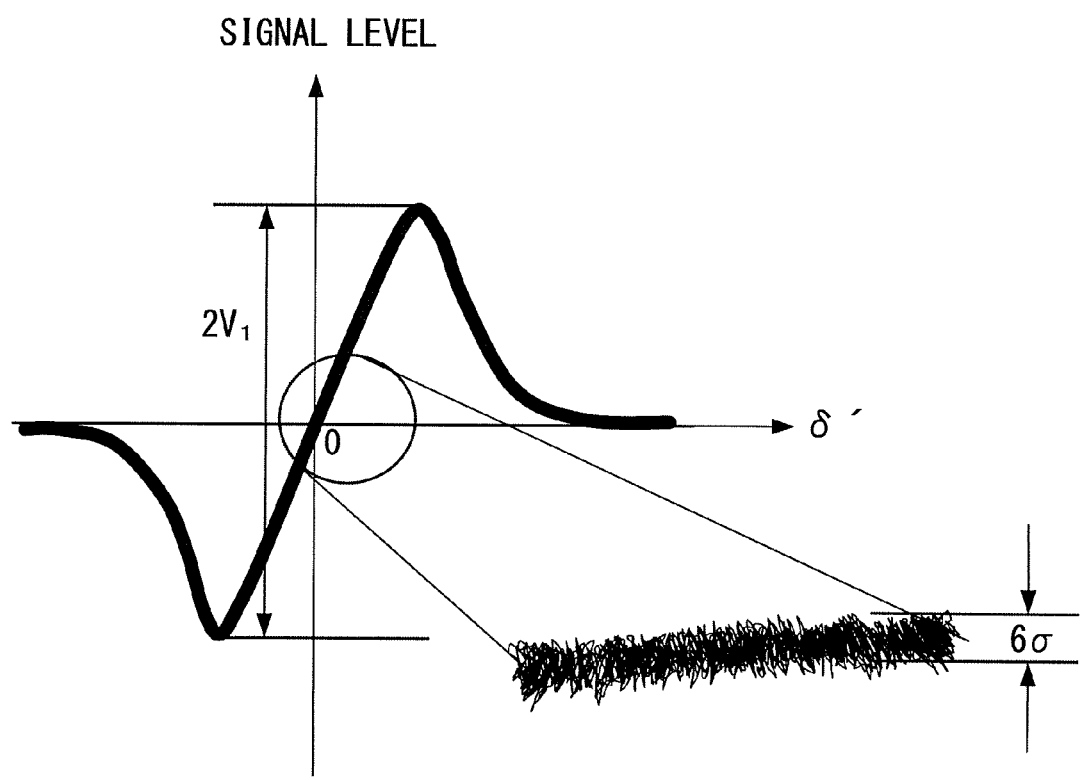
FIG. 8 is an enlarged view illustrating $\delta$-dependence of the error signals obtained from the light detection signals and modulation signals.

FIG. 8 is an enlarged view illustrating $\delta$-dependence of the error signals (Err) obtained from the light detection signals and the modulation signal, plotting the phase delay $\delta$, horizontally, versus signal level, horizontally.

The error signals Err are the signals, which are obtained based on the balance of reflected sideband signals on both sides (both side waves) when the resonance frequency of the resonator approaches the frequency of the laser light, indicating the direction, and the magnitude of the displacement from the resonance position ($\delta'=0$, for example). Namely, on the right side of FIG. 8, the signal level increases to reach a positive peak value as moving forward along the δ' axis, then decreases sharply to asymptotically approach to the axis as moving forward further. On the left side of FIG. 8, by contrast, the signal level decreases to reach a bottom value as moving in the reverse direction on the δ' axis, then increases sharply to asymptotically approach to the axis. Thus, this graphical curve substantially has a rotational symmetry of 180 degrees with respect to the origin at δ'=0, and the direction and the magnitude of deviation from the resonance position can therefore be kept track from the error signal.

In regard to sidebands generated by modulating the frequency of incident light with the modulation frequencies, since the upper sideband is opposite in polarity to the lower sideband, an error signal Err corresponding to the balance of sidebands is obtained in the vicinity of the resonance point (minimum reflectivity point) by performing the synchronous detection of the sideband signals (high frequency component) included in the light reflected by the external resonator with respect to the local oscillation signal sent from local oscillator (signal generating unit 3).

After matching the center of resonance with the zero point of the error signal by adjusting the phase of the local oscillator, the locking to the resonance point is achieved by adjusting the circular resonator length L through suitably adjusting the mirror or other similar element by driving with the servo control unit 48 (FM sideband method). On locking to the resonance point, the apparent reflectivity of the external resonator sharply decreases, and almost all the incident light is led into the external resonator. Simultaneously, inside the external resonator arises the circulation of light having a power far greater than the incident light, and the conversion efficiency of nonlinear optical element 20 is increased, as a result.

When the first external resonator 6 is in the resonance state, and the light having the large power and circulating inside the first external resonator 6 is converted into another wavelength with the nonlinear optical element 20 (into half wavelength in the case of SHG), upper and lower sidebands are generated around the central frequency of the light after the wavelength conversion, $2f_L$. Therefore, the upper and lower sidebands have the frequencies different from $2f_L$ by $\pm f_c$, respectively, and are subsequently rendered incident to the second external resonator 9 via optical system 8.

These sidebands can be used for locking the second external resonator 9 as the resonator at the succeeding stage. Further, when these sidebands are used for locking the third external resonator, the selection of related frequencies can be carried out insofar as the conditions are satisfied that some of the sidebands are reflected by the first external resonator 6, and that the rest of the sidebands passes through the first external resonator 6 and subsequently reflected by the second external resonator 9.

When a negative feedback system for correcting the position or other similar parameter of a component (such as a mirror or the like) of the external resonator is formed in the control circuit 19, and the circular optical path length L of each of the resonators is controlled by the negative feedback system so that the error will be zero, the resonance state can be maintained. In this case, by including as many sidebands (sideband components) as possible in the reflected light, the amplitude of error signal Err increases and the signal-to-noise (S/N) ratio thereof can be increased, in general.

Among several definitions of the S/N ratio, there adopted presently is the value which is obtained as (a) one-half of the potential difference between the two peaks $(2V_1)$ of the S-shaped error signal plot of FIG. 8, i.e., $V_1$ (signal), divided by (b) the numerical value corresponding to one sixth (⅙) of line breadth or width (noise) observed on oscilloscope screen in the slope portion between the peaks of the error signal plot. This is due to the fact that the line width is generally six times (±three times) the standard deviation σ, or the root-mean-square (RMS) of variation.

In order to increase S/N ratio of error signal Err in the configuration of FIG. 2, it is preferable that the sideband frequency $f_c$ be sufficiently large as compared with the frequency range corresponding to the transmission width of the second external resonator 9. On the other hand, when the sideband frequency is larger than the frequency range corresponding to the transmission width of the first external resonator 6, almost all sidebands are reflected by the first external resonator 6 and rarely enter to the resonator 6. As a result, the frequency of the sideband decreases for the wavelength-converted light incident to the second external resonator 9 from the first external resonator 6, and the S/N ratio deteriorates of error signal Err, which is desirable for locking the second external resonator 9. Thus, this gives rise to a trade-off concerning to the sideband frequency.

Accordingly, in the case of determining the frequency of the modulation signal $f_c$ at the design stage, it is preferable to give consideration to the S/N ratio, which is obtained for the external resonator at each stage, adopting an appropriate value or an averaged value as one of the measures of system stability. For example, a product P may be effective as this appropriate value when the product P takes a maximum described as follows. Assuming the S/N ratio of error signal obtained for the j-th external resonator as $(S/N)_j$ (where j= 1, 2, ... ), the product P is expressed by the equation (2).

$$P=(S/N)_1\times(S/N)_2\times \quad (2)$$

Subsequently, by computing n-th root of the product of all of n S/N ratios of error signals each obtained for n (number of) external resonators, a geometric mean of S/N ratios is obtained of the error signals obtained for the n external resonators. Thus, the obtained geometric mean is equal to the value when the product P expressed by the equation (2) is the maximum, thereby fulfilling the requirement for obtaining the abovementioned average value.

Therefore, the carrier frequency (frequency of modulation signal) optimum for locking can be determined on various conditions at the stage of designing the laser light generating apparatuses. However, there may give rise to deviations in practice between designed figures and the figures of commercially produced apparatuses related to their manufacturing tolerance. As a unit for reducing such deviations, it is preferable to provide a unit for initializing the frequency of modulation signal so that S/N ratios obtained for external resonators at respective stages may be averaged.

This is implemented, for example, by providing such a configuration that a user can adjust manually the frequency of the modulation signal generated by the signal generating unit 3. Alternatively, a further unit is provided by connecting the signal generating unit 3 with a computer (not shown) to be capable of mutually transferring data. Then, this unit is so configured, upon inputting an optimum frequency value of a modulation signal into the computer by a user through an input device, that the frequency to be outputted from the signal generating unit 3 can be set appropriately on the basis of the inputted frequency data of the modulation signal.

In general, it is more effective to decrease the transmission width of second external resonator 9 to be comparable to, or smaller than, that of the first external resonator 6 within the limits of the possible. In addition, the reflectivity of the sidebands is preferably in the range of approximately from 20 to 80%. When the calculation is made using the equation (1) and taking the abovementioned factors related to transmission and reflectivity into consideration, the frequency $f_c$ of the sidebands is obtained preferably to be in the range of 0.5 to 2 times transmission width frequency of the first external resonator centered at the resonance frequency of the first external resonator, and simultaneously in the range of at least 0.5 times transmission width frequency of the second external resonator 9 centered at the resonance frequency of the first external resonator 6, in which the transmission width frequency (half width at half height) denotes the frequency range which corresponds to the abovementioned transmission width.

In regard to the laser light generating apparatus 100 according to the first embodiment of the invention, specific numbers are cited as follows. As the laser light source 2 for lasing at single frequency, there used are a single frequency ring resonator Nd:YAG laser having an emission at 1064 nm, and alternatively a fiber laser configured to amplify either the abovementioned laser emission or an emission from another DFB (distributed feedback) fiber laser. The output emission from laser light source 2 is rendered incident to the phase-modulator 4 provided with an electro-optic crystal. In the case of ordinary single-stage FM sideband locking, the voltage applied to the phase-modulator 4 is determined from several factors such as the length of the crystal, the desirable field strength specified by effective electro-optic coefficients, and the inter-electrode distance.

For a KPT crystal utilizing the $r_{33}$ component (Pockels coefficient), having a light transmitting face with a length of 12 mm and an inter-electrode distance of 3 mm, a voltage ranging from several to approximately 20 (volt) is sufficient to be applied to the crystal. In the first embodiment of the invention, the voltage of approximately same magnitude is sufficient insofar as the reflectivity of sidebands from the first external resonator 6 is brought to be approximately 50%, and by the second external resonator 9 to be 70% or larger, through suitable adjustments of circular optical path lengths for the external resonators.

However, a larger voltage may be necessary as the case of longer resonance wavelengths. In such a case, the locking is stabilized by amplifying the modulation signals generated by signal generating unit 3 to the range of from 20 to 150 V by means of an electric amplifier. Alternatively, in order to implement the signal modulation efficiently without raising a power source voltage so much, the phase-modulator 4 can be operated effectively as aforementioned (FIG. 4) by applying two voltage signals of opposite polarity to each of two opposing electrodes included in the modulator 4.

Laser light emitted from the laser light source 2 is subjected to the phase modulation, and subsequently rendered incident to the first external resonator 6 via the optical system 5. In this process, the spatial matching between the incident light and resonator mode is called as mode matching with its efficiency possibly reaching to a maximum of 100%. In practice, however, the mode matching efficiency is approximately ranging from 70 to 95% in most cases, and varies depending on laser beam qualities which are expressed by the M2 value, the beam parameter product (BPP) indicative of the beam spread angle, and other similar parameters.

When the circular optical path length is assumed to be 380 mm for the first external resonator 6, its free spectral range (FSR) is approximately 800 MHz. This results in the value $\delta'=0.05\pi$ shown in FIG. 7A to correspond to 20 MHz, assuming 1/40 of the wavelength. Accordingly, the frequency of high frequency signals applied to an electro-optic crystal as the nonlinear optical element 20 is now assumed to be 20 MHz, for example. When the 20 MHz high frequency signals are applied to the phase-modulator 4, the characteristics of the effective reflectivity and modulation frequency are nearly the same as those shown in FIGS. 7A and 7B (corresponding to the case of correct locking).

In this case of locking, the first external resonator 6, approximately 90% of the sidebands incident thereto is reflected by the entrance mirror to be incident to a photo-diode, which is disposed in the photodetector for use in locking servo, and the remaining 10% of the sidebands is rendered incident to the interior of the resonator. The sidebands entered to the first external resonator 6 are then circulated inside the resonator to reach resonance state. This is true not only for the central light frequency $f_L$, but also for the sideband frequency. When the power of the light circulating in the resonator at the resonance state is taken as circulating power, this power is found to be equal to that of the incident light amplified approximately by a factor of $[1/(1-\sqrt{(R_1 R_m)})]$.

In the case of the incident light power of 20 W, mode matching efficiency of approximately 100%, and $R_1=R_m=95\%$ (i.e., reflectivity $R_1$ for the entrance mirror and composite reflectivity $R_m$ for the external resonator, being equal to each other to be 95%), the light power incident to first external resonators 6 is amplified 20 times to be 400 W. If a further case is assumed with $R_1=R_m=99.5\%$, there arises a greater increase of 200 times, which is also feasible. With respect to the light having a circulating power of 400 W incident on an LBO crystal of approximately 30 mm in thickness, the generation of a second-harmonic wave (532 nm) is expected having a power of the order of several watts.

It is assumed that the light at the wavelength of 532 nm emerging from first external resonator 6 is rendered incident to the second external resonator 9 via the optical system 8. For reasons of simplicity, the circular optical path length of the second external resonator 9 is assumed to be the same 380 mm as the abovementioned length of the first external resonator 6. Since the free spectral range (FSR) is approximately 800 MHz, the frequency range $\delta'$ corresponding to the transmission width (full width at half height) for $R_1=R_1=99.5\%$ is obtained to be $0.013\pi$, which corresponds to 16 MHz in frequency in terms of half width at half height. When the sidebands are adopted having a frequency of 20 MHz, this sideband frequency is as large as 0.5 times the transmission width of second external resonator 9, or greater. As a result, approximately 60% of the incident light is reflected by the resonator 9 in this case, and error signals are obtained with increased S/N ratios.

FIGS. 9A, 9B, and 9C are graphical plots each illustrating the correlation between the effective reflectivity and error signals at locking for three stage resonators, in which FIG. 9A includes the plots for the first stage external resonator configured to perform a wavelength conversion from 1064 into 532 nm, FIG. 9B for the second stage external resonator configured to perform the conversion from 532 into 266 nm, and FIG. 9C for the third stage external resonator configured to perform the conversion from 266 into 198 nm.

It should be noted in this context that the currently converted wavelength 198 nm included in FIG. 9C, differs from 133 nm (i.e., half the wavelength prior to the conversion 266 nm). This wavelength of 198 nm is obtained experimentally through practical attempts to avoid irradiation damages which are otherwise caused by ultraviolet light at shorter wavelengths. It is also found from the effective reflectivity versus frequency plots, that the transmission width of external resonator will be narrower as the stage proceeds from first, second, and to the third stage resonator. As a result, the reflectivity of the resonator increases at the third stage and error signals can be obtained with an improved S/N ratio.

According to the first embodiment of the invention described above regarding to the locking system including plural external resonators, the number of phase-modulators for use in the system can be reduced and this may give rise to cost-reduction effects. In addition, since the types of phase-modulators can be more limited for use also in the locking system, undue procurement costs and confounding risks decrease.

Still in addition, by configuring to implement the phase modulation by means of multi-staged external resonators with either infrared or visible light, the phase-modulator can be used free from care of any damage caused by ultraviolet light beams. Therefore, repair costs are decreased and a high voltage power source for operating the phase-modulator can be dispensed.

For further locking methods, which operate with modulation signals having multiple different frequencies, the abovementioned configuration can be effective in view of simplifying the system construction by including only one signal generation unit.

Furthermore, in the case where the locking simultaneously plural external resonators is carried out using one single modulation signal, by initializing the frequency of the modulation signal so that S/N ratios of error signals obtained for external resonators at respective stages may be optimized via setting the product of S/N ratios of error signals obtained from reflected light by external resonators at respective stages so as to be at least nearly maximum, the rate of modulation light reflected from each of the external resonators can be optimized on the whole, and the locking operation for locking system can be stabilized, as a result.

In the next place, a modification to the first embodiment is, described according to the invention. FIG. 10 is a view illustrating a modification to the first embodiment shown in FIG. 1.

A laser light generating apparatus 100A has the system configuration similar to the laser light generating apparatus 1 (FIG. 1) with the exception that the apparatus 100A is additionally provided with a modulation frequency setting unit 49. The components and units included in FIG. 10 similar to those shown in FIG. 1 are shown by identical numerals and the repeated description thereof is herewith omitted.

As aforementioned, it is desirable to determine the modulation signal frequency optimum for locking on various conditions at design stages of laser light generating apparatuses. However, several changes over time after the initialization may arise due to several factors. For example, an increase of resonator loss over time and decrease of conversion efficiency of nonlinear optical elements may cause a change of the transmission width of external resonators. In this case, the change of transmission width effects in turn a deviation of the product P of S/N ratios for error signals (Equation 2) from its maximum value which is set previously, especially under the condition of fixed modulation frequency. In such a case, it is desirable to maintain the product P of S/N ratios at least in the vicinity of the maximum so that the locking system may be prevented from becoming unstable.

Accordingly, a modulation frequency setting unit 49 is additionally provided, which is configured to suitably change the frequency of the modulation signal generated by the signal generating unit 3 in order that the laser light generating apparatus 100A may be stabilized with this setting unit. Alternatively, the modulation frequency setting unit 49 may be configured to correspond to the change of transmission width by suitably adjusting detection phases.

FIG. 11 is a view illustrating the fundamental configuration of a further control system including the phase-modulator and the photodetector. Since the first and second external resonators 6 and 9 have a similar circuit configuration, it should be noted that the parts and components common to both of the external resonators are shown in FIG. 11 with corresponding numerals side by side. In addition, the components and units similar to those shown in FIG. 5 are shown by identical numerals and the repeated description thereof is herewith omitted.

First, a modulation signal is generated by the signal generating unit 3 having an initialized frequency fc, and subsequently applied to the phase-modulator 4 (EOM), to thereby subject the laser light to the phase modulation.

Next, two kinds of signals are transferred to a detection unit 47. Namely, the first kind of signals are detection signals, which are generated by the light reflected from the first external resonator 6 and from the second external resonator 9 and detected by the photodetectors such as the photodetector 14 for the first external resonator 6 and the photodetector 15 for the second external resonator 6 (FIG. 11), and the second kind is a modulation signal as a local oscillation signal at a high frequency fc. Subsequently, based on the detection signals detected by the photodetectors 14 and 15, and the local oscillation signal at the frequency fc sent from a local oscillator (signal generating unit 3), the detection unit 47 performs synchronous detection, to thereby generate error signals Err. The error signals Err are sent to a servo control unit 48 and to the modulation frequency setting unit 49, as well.

The servo control unit 48 generates control signals in order that the level of the error signal Err will be zero, and controls the optical path length (i.e., circular optical path length) for each external resonator to be equal to an integral multiple of the laser wavelength using the control signals. On the other hand, the modulation frequency setting unit 49 operates to monitor error signals Err outputted from the detection unit 47, and to implement the control of the frequency and detection phases of the modulation signal which is supplied from the signal generating unit 3 to the phase-modulator 4, based on the error signals Err.

According to this configuration of the first embodiment, the following effectiveness can be obtained; even when the transmission width of external resonators varies due to the changes over time of resonator loss and conversion efficiency, it will be feasible to acquire error signals caused by the changes, and to set, based on the error signals, the frequency of the modulation signal applied to the phase-modulator to such a value that S/N ratios of error signals for each external resonator can be averaged. This is achieved, for example, by controlling S/N ratios of error signals to be optimized continually through maintaining the product of S/N ratios of error signals to be maximum. As a result, the locking system can always be kept at the resonance state without affected by instability.

Second Embodiment

FIG. 12 is a view schematically illustrating a laser light generating apparatus according to a second embodiment of the invention. The components and units included in FIG. 12 similar to those shown in FIG. 2 are shown by identical numerals and the repeated description thereof is herewith omitted.

To ensure sufficiently large S/N ratios of the error signals for the external resonator 9 at the final stage, it is an effective measure to dispose an element having amplification capabilities between the phase-modulator 4 and first external resonator 6. In an example of the laser light generating apparatus 200 shown in FIG. 12, this effective measure is achieved on the basis of the structure of the laser light generating apparatus 100 according to the first embodiment of the invention (FIG. 2), by additionally disposing an amplifier 50 on the optical axis between the phase-modulator 4 and first external resonator 6, with other components and units retained similar to those included in the laser light generating apparatus 100.

Referring to FIG. 12, laser light LT0 generated by a laser light source 2 is subjected to the phase modulation using a modulation signal having a single frequency, led through an optical system 5, an amplifier 50, and another optical system 5a, and subsequently rendered incident to a first external resonator 6. Succeeding steps are carried out in a manner similar to those aforementioned in reference to FIG. 2, so that the light output, which is resulted from an efficient wavelength conversion inside the first external resonator 6, is incident on the second external resonator 9 at the following stage, and that the light LT2 resulted from another wavelength conversion inside the second external resonator 9 is outputted to the exterior.

In a case where the phase-modulator 4 is disposed in the rear of the amplifier 50, a damage of the phase-modulator 4 may be caused by a high-power light amplified by the amplifier 50. Accordingly, it is effective for the simplification and longevity of the locking system to amplify the laser light LT0 after phase modulation, and to lead the modulated light to enter the first external resonator 6, followed by carrying out the wavelength conversion.

Suitable examples of the amplifier 50 include an optical fiber amplifier, a solid laser amplifier using a laser medium in bulk form, and a semiconductor laser amplifier using semiconductor chips. With the recent development of double-clad fibers, a fiber laser amplifier will be available with relative ease, which is configured to implement the coaxial transmission of excited light from low-luminosity semiconductor lasers using a cladding layer having an aperture of high NA number. This can be carried out by leading the excited light incident to the core, and by amplifying the incident light. It should be noted that the abovementioned fiber laser amplifier may suitably be adopted as the amplifier 50 in the structure of the laser light generating apparatus according to this embodiment.

According to the second embodiment of the invention, the laser light generating apparatus is configured to carry out the phase modulation of laser light with a low power prior to its amplification, and the wavelength conversion following the amplification. Therefore, the following effect can be obtained, such as obviating undue damage of the phase-modulator, and maintaining both the power output after wavelength conversion and the conversion efficiency at high level.

Third Embodiment

FIG. 13 is a view schematically illustrating a laser light generating apparatus according to a third embodiment of the invention. The components and units included in FIG. 13 similar to those shown in FIG. 2 are shown by identical numerals and the repeated description thereof is herewith omitted.

Referring to FIG. 13, the laser light generating apparatus 300 according to the third embodiment of the invention includes at least a first external resonator 60 and a second external resonator 9A. The first external resonator 60 includes an entrance mirror 61 and other mirrors 62 to 65, and a laser medium 66. The laser medium 66 is disposed on the optical axis between mirrors 62 and 63 and an optical system 67 and a pumping source 68 are located on the extension of the laser medium 66 and the mirror 63. Excitation light emitted from the pumping source 68 is rendered incident to the mirror 63 via the optical system 67, and subsequently passes through the mirror 63 to irradiate the laser medium 66.

On the other hand, light LT0 emitted from a laser light source 2 is subjected to phase modulation by a phase-modulator 4 using a modulation signal having a predetermined frequency, and subsequently rendered incident to a first external resonator 60 via optical system 5. Light incident to the first external resonator 60 is led through mirrors 61 and 62 a laser medium 66, further mirrors 63, 64, 61, and 65 in sequence, and rendered incident to the second external resonator 9A at the following stage. The light LT3 resulted from a wavelength conversion inside the second external resonator 9A is outputted to the exterior.

The laser light generating apparatus 300 is configured for laser light LT0, which is generated by a laser light source 2, to be introduced into a first external resonator 60 via an optical system 5 after being subjected to phase modulation using modulation signals having a single frequency, and subsequently be amplified, which is called as the method of injection locking. In this case, upon matching the longitudinal mode (resonance frequency) of the first external resonator 60 with the frequency of the light LT0 currently introduced, the light enters to the first external resonator 60, and amplified by the laser medium 66. As a result, this system operates as though that having an increased reflectivity.

Therefore, by taking out some of reflected light with the mirror 65 and carrying out locking according to the FM sideband method using sidebands included in the reflected light, light can be extracted from the first external resonator 60 having a power greater than the incident light LT0. Thus obtained light is rendered incident to second external resonator 9A via optical system 5, to subsequently carry out a wavelength conversion using a nonlinear optical element 30A. Since no wavelength conversion is performed in the first external resonator 60, there utilized presently for locking the second external resonator 9A are the light and sidebands having the same frequency as those used for locking the first external resonator 60.

According to the third embodiment of the invention, since the laser light generating apparatus is configured to amplify the incident light by the laser medium disposed in the first external resonator 60, it is effective for simplifying the system construction (space savings), and for increasing the conversion efficiency in the second external resonator due light, which is led thereto, having an increased power after amplification. Other effectiveness includes those obtained in the second embodiment.

Fourth Embodiment

FIG. 14 is a view schematically illustrating a laser light generating apparatus according to a fourth embodiment of the invention. The components and units included in FIG. 14 similar to those shown in FIGS. 2 and 13 are shown by identical numerals and the repeated description thereof is herewith omitted. Referring to FIG. 14, a laser light generating apparatus 400 according to the fourth embodiment of the invention includes at least a first external resonator 70 and a second external resonator 9, and is provided with a nonlinear optical element 20 as the wavelength conversion crystal, which is included in the first external resonator 70. Therefore, the configuration of the first external resonator 70 is formed by additionally disposing the nonlinear optical element 20 in the aforementioned first external resonator 60 according to the third embodiment of the invention, which has the capability of injection locking.

The first external resonator 70 includes an entrance mirror 71 and other plural mirrors 72 to 74, a nonlinear optical element 20 for use in wavelength conversion, and a laser medium 66. The laser medium 66 is disposed on the optical axis between mirrors 72 and 73 and an optical system 67 and a pumping source 68 are located on the extension of the laser medium 66 and mirror 73. Excitation light emitted from the pumping source 68 is rendered incident to the mirror 73 via the optical system 67, and subsequently passes through the mirror 73 to irradiate the laser medium 66.

The light LT0 emitted from a laser light source 2 is subjected to phase modulation by a phase-modulator 4 using a modulation signal having a single frequency, and subsequently rendered incident to the first external resonator 70 via optical system 5. Light incident to the first external resonator 70 is led through mirrors 71 and 72 the laser medium 66, further mirrors 73, 74, and 71 in sequence, and then rendered incident to a second external resonator 9 at the following stage. Light LT4 resulted from the wavelength conversion inside the second external resonator 9 is outputted to the exterior. Based on the sidebands included in the light reflected by the mirror 71 in the first external resonator 70 and by the mirror 31 in the second external resonator 9, error signals are obtained. Subsequently, the locking of each of the external resonators 70 and 9 is carried out based on the error signals.

According to the fourth embodiment of the invention, this laser light generating apparatus can perform the wavelength conversion with an extremely high efficiency, simultaneously with amplifying the light incident to first external resonator 70, in addition to the effectiveness obtained in the third embodiment of the invention.

Fifth Embodiment

FIG. 15 is a view schematically illustrating a laser light generating apparatus according to a fifth embodiment of the invention. The components and units included in FIG. 15 similar to those shown in FIG. 2 are shown by identical numerals and the repeated description thereof is herewith omitted.

In the previous first through fourth embodiments of the invention, the steps of the wavelength conversion are mostly described concerning the case of inputting light at one frequency and then outputting at a different frequency. In contrast, there described according to the fifth embodiment of the invention is the case of two-frequency input and one-frequency output, which is carried out using a light output from the first external resonator 6, a further laser light output, and a second external resonator 80 and a third external resonator 90, which are provided to share one wavelength conversion crystal with each other.

The second external resonator 80 includes at least four mirrors 81 to 84 and a non linear optical element 110 for use in the difference frequency mixing. Specifically, an optical path is formed, in which the light of rendered incident to mirror 81 from first external resonator 6 passes through the nonlinear optical element 110, reflected by mirrors, 82, 83, and 84, in sequence, and subsequently returns to the mirror 81. Light emitted at a single frequency from a laser light source 96 is render to incident to the third external resonator 90 via an optical system 95 for use in the mode matching. The third external resonator 90 is provided with four mirrors 91 to 94 and with the nonlinear optical element 110 which is shared with the second external resonator 80. Another optical path is formed, in which the light incident to mirror 91 from the laser light source 96 reflected by the mirror 92 passes through the nonlinear optical element 110, reflected by the mirrors 93 and 94 in sequence, and returns to the mirror 91.

The control of locking the first and second external resonators 6 and 80 is similar to that described earlier. Specifically, the control is carried out by applying a modulation signal having a frequency fc to a phase-modulator 4, and by configuring at the same time so that some of modulation components (sideband) of reflected light with the frequency fc may be reflected by the first external resonator 6 and the rest of the sidebands may pass through the first external resonator 6, and be reflected by the second external resonator 80. Subsequently, as a result of the sum frequency generation utilizing the nonlinear optical element 110 with the light emitted from laser light source 96 and the light output from the first external resonator 6, a light output LT5 is generated by the nonlinear optical element 110.

For example, by performing the wavelength conversion in the first external resonator 6 so that the light emitted at a wavelength of 532 nm from laser light source 2 may be converted into 266 nm and be used for locking to the second external resonator 80, and simultaneously that another laser output may be subjected to locking to the third external resonator 90, both of the abovementioned lights can be converted into desirable wavelengths through the sum frequency mixing and difference frequency mixing implemented with the nonlinear optical element (wavelength conversion crystal) 110.

Examples of the methods of wavelength conversion include the second harmonic generation, sum frequency generation, and difference frequency generation. In addition, a further method may be cited for generating light at longer wavelengths using an OPO (optical parametric oscillator). Therefore, various modifications can be contemplated on the method of the wavelength conversion.

As described hereinabove, the system configuration can be utilized, being configured for the light emitted from laser light source 2 to pass through the phase-modulator 4 applied with a modulation signal and subsequently to be subjected to the wavelength conversion using the nonlinear optical element 20 disposed in the first external resonator 6, and to be rendered incident sequentially to plural external resonators (external resonators arranged in column, for example) without passing through another phase-modulator. Also in this case, each of the external resonators can be maintained simultaneously at the resonance state according to FM sideband method using the modulation signal and error signals generated from signals in reflected light detected by photodetectors for the external resonators.

For achieving the stable locking of external resonators, it is preferable that each of the sidebands be generated by modulating the light emitted from the laser light source 2, and either sum frequency signal or difference frequency signal obtained from the sidebands, respectively, to retain a stable spatial relationship with respect to the frequency of the modulation signal (oscillation frequency of signal generating unit 3). This is achieved preferably by configuring to adjust the amount of phase delay independently for each of the sidebands during the synchronous detection. For example, by interposing delay circuits between the photodetectors 14 and 15 and the signal processing circuit 47, as shown in FIG. 5, a configuration can be achieved for suitably adjusting the phase delay of the photo-detected signals.

Suitable materials for use in the nonlinear optical element according to the aforementioned embodiments of the invention include nonlinear optical materials such as $KTiOPO_4$ (KTP), $\beta\text{-}BaB_2O_4$ (BBO), $LiB_3O_5$ (LBO), $MgO{:}LiNbO_3$;

PP-KTiOPO$_4$, PP-MgO:LiNbO$_3$, PP-MgO:S—LiNbO$_3$, PP-S—LiTaO$_3$, PP-MgO:S—LiTaO$_3$, and other similar materials.

Among the above-named notations, "PP" stands for periodical poling (or, periodically poled), indicating the nonlinear optical element formed of nonlinear optical crystals through the periodic poling processing onto the crystals by the application of electric field and others, thereby resulting the periodically poled structure. These materials are processed so as to satisfy (quasi) phase matching conditions by being shaped to have a suitable angle for satisfying phase matching conditions at the wavelength presently used, and being formed to have an appropriate periodically poled structure.

In addition, the notation "S" indicates the stoichiometric composition of the materials. In addition, it is preferable that the size of the nonlinear optical element is relatively larger than the beam size of the fundamental wave and converted waves inside external resonators. These optical crystals may also be used for the wavelength conversion such as sum frequency generation, parametric amplification, third harmonic generation, and others.

Although one nonlinear optical element (optical crystal) has been recited with the identical name in the cases of the same converted wavelength in describing the respective embodiments of the invention, other suitable optical crystals may alternatively be used. In the case of different converted wavelengths, by contrast, the crystal direction may vary for suitable phase matching conditions even on the same crystal. In addition, when a surface coating material is used to protect the optical crystal, the wavelength of selective transmission range varies depending on the coating material. It is a matter of course that a different optical crystal may be used for each of the converted wavelengths.

It is understood that the configuration of the invention is not limited to the embodiments disclosed hereinabove. For example, various changes and modifications may be implemented, without departing from the scope of the invention, with respect to the number of optical elements disposed in the multiple-reflection section inside the resonator included in the laser light generating apparatus and the number of lenses for use in coupling resonators included in the apparatus, and also to the materials composition and other requisite factors for structuring the apparatus. In addition, higher harmonics generated by the nonlinear optical element for wavelength conversion is not limited to the second harmonics. Thus, with the nonlinear optical element, further harmonics such as third or more can be obtained, and the high harmonics generation through the sum frequency generation and the wavelength conversion through parametric oscillation can also be carried out.

It should be understood by those skilled in the art that various modifications, combinations, sub-combinations and alterations of the invention may occur depending on design requirements and other factors insofar as they are within the scope of the appended claims or the equivalents thereof.

What is claimed is:

1. A laser light generating apparatus, comprising:
a laser light source;
a first external resonator and a second external resonator disposed at a stage succeeding the first external resonator;
a phase-modulator disposed on an optical path between the laser light source and the first external resonator, the phase-modulator being applied with a modulation signal;
a signal generating unit configured to generate the modulation signal applied to the phase-modulator;
first and second nonlinear optical elements disposed in the first and second external resonators, respectively, configured to implement a wavelength conversion of a laser light incident on each of the first and second external resonators;
an optical path length varying means for varying an optical path length of each of the first and second external resonators;
at least one photodetector configured to receive the laser light emerging from each of the first and second external resonators; and
a control circuit having a negative feedback arrangement configured to acquire at least one detection signal received by the at least one photodetector and the modulation signal to thereby obtain error signals for each of the first and second external resonators, and configured to control the optical path length varying means using the error signals according to an FM sideband method, wherein
the first and second external resonators are each held simultaneously in a resonance state by setting a frequency of the modulation signal to be equal to a value which is obtained so that S/N ratios of the error signal for each of the first and second external resonators may be averaged, and by controlling the optical path length of each of the first and second external resonators by the control circuit, wherein
a frequency of sidebands generated by a phase modulation of the laser light is set in a first range of from 0.5 to 2 times a first frequency range corresponding to a transmission width, in terms of half width at half height, of the first external resonator centered at a resonance frequency of the first external resonator, and simultaneously in a second range of at least 0.5 times a second frequency range corresponding to the transmission width of the second external resonator centered at the resonance frequency of the first external resonator.

2. A laser light generating apparatus, comprising:
a laser light source;
a first external resonator having a gain medium therein;
a second external resonator disposed at a stage succeeding the first resonator;
a phase-modulator disposed on an optical path between the laser light source and the first external resonator, the phase-modulator being applied with a modulation signal;
a signal generating unit configured to generate the modulation signal applied to the phase-modulator;
a nonlinear optical element disposed in the external resonators other than the first external resonator, configured to implement a wavelength conversion of an incident laser light;
an optical path length varying means for varying an optical path length of each of the first and second external resonators;
at least one photodetector configured to receive the laser light emerging from each of the first and second external resonators; and
a control circuit having a negative feedback arrangement configured to acquire at least one detection signal received by the at least one photodetector and the modulation signal to thereby obtain an error signal for each of the first and second external resonators, and configured to control the optical path length varying unit using the error signal according to an FM sideband method, wherein the first and second external resonators are each held simultaneously in a resonance state by setting a frequency of the modulation signal to be equal to a value which is obtained so that S/N ratios of the error signal for each of the first and second external resonators may be averaged, and by controlling the optical path length of each of the first and second external resonators by the control circuit, wherein a frequency of sidebands generated by a phase modulation of the laser light is set in a first range of from 0.5 to 2 times a first frequency range corresponding to a transmission width, in terms of half width at half height, of the first external resonator centered at a resonance frequency of the first external resonator, and simultaneously in a second range of at least 0.5 times a second frequency range corresponding to the transmission width of the second external resonator centered at the resonance frequency of the first external resonator.

3. A laser light generating apparatus, comprising:

a laser light source;

a first external resonator having a gain medium therein;

a second external resonator disposed at a stage succeeding the first resonator;

a phase-modulator disposed on an optical path between the laser light source and the first external resonator, the phase-modulator being applied with a modulation signal;

a signal generating unit configured to generate the modulation signal applied to the phase-modulator;

first and second nonlinear optical elements respectively disposed in the first and second external resonators, configured to carry out a wavelength conversion of a laser light incident on each of the first and second external resonators;

an optical path length varying means for varying an optical path length of each of the first and second external resonators;

at least one photodetector configured to receive the laser light emerging from each of the first and second external resonators; and a control circuit having a negative feedback arrangement configured to acquire at least one detection signal received by the at least one photodetector and the modulation signal to thereby obtain an error signal for each of the first and second external resonators, and configured to control the optical path length varying means using the error signal according to an FM sideband method, wherein the first and second external resonators are each held simultaneously in a resonance state by setting a frequency of the modulation signal to be equal to a value which is obtained so that S/N ratios of the error signal for each of the first and second external resonators may be averaged, and by controlling the optical path length of each of the first and second external resonators by the control circuit, wherein a frequency of sidebands generated by a phase modulation of the laser light is set in a first range of from 0.5 to 2 times a first frequency range corresponding to a transmission width, in terms of half width at half height, of the first external resonator centered at a resonance frequency of the first external resonator, and simultaneous in a second range of at least 0.5 times a second frequency range corresponding to the transmission width of the second external resonator centered at the resonance frequency of the first external resonator.

4. A laser light generating apparatus according to claim 1, wherein first and second voltage signals of opposite in polarity and the same in phase, are applied to first and second electrodes of the phase-modulator, respectively, the first and second electrodes being formed on a first surface of the phase-modulator, and on a second surface opposite to the first surface, respectively.

5. A laser light generating apparatus according to claim 1, further comprising:

a modulation frequency setting means for acquiring error signals caused by the changes in the transmission width of the external resonators, and for setting the frequency of modulation signal applied to the phase-modulator to such a value that S/N ratios of the error signals for the external resonators are each averaged based on the error signal.

6. A laser light generating apparatus according to claim 1, wherein the frequency of the modulation signal applied to the phase-modulator is set so as to maintain a product P of S/N ratios of the error signals for the external resonators to be approximately equal to a maximum.

7. A laser light generating apparatus according to claim 1, wherein some of sidebands generated by the phase modulation of the laser light are reflected by the first external resonator, while the other sidebands pass through the first external resonator and are subsequently reflected by the second external resonator.

8. A laser light generating apparatus, comprising:

a laser light source;

a first external resonator and a second external resonator disposed at a stage succeeding the first external resonator;

a phase-modulator disposed on an optical path between the laser light source and the first external resonator, the phase-modulator being applied with a modulation signal;

a signal generating unit configured to generate the modulation signal applied to the phase-modulator;

first and second nonlinear optical elements disposed in the first and second external resonators, respectively, configured to implement a wavelength conversion of a laser light incident on each of the first and second external resonators;

an optical path length varying unit configured to vary an optical path length of each of the first and second external resonators;

at least one photodetector configured to receive the laser light emerging from each of the first and second external resonators; and a control circuit having a negative feedback arrangement configured to acquire at least one detection signal received by the at least one photodetector and the modulation signal to thereby obtain error signals for each of the first and second external resonators, and configured to control the optical path length varying unit using the error signals according to an FM sideband method, wherein the first and second external resonators are each held simultaneously in a resonance state by setting a frequency of the modulation signal to be equal to a value which is obtained so that S/N ratios of the error signal for each of the first and second external resonators may be averaged, and by controlling the optical path length of each of the first and second external resonators by the control circuit, wherein a frequency of sidebars generated by a phase modulation of the laser is set in a first range of from 0.5 to 2 times a first frequency range corresponding to a transmission width, in terms of half width at half height, of the first external resonator centered at a resonance frequency of the first external resonator, and simultaneous in a second range of at least 0.5 times a second frequency range corresponding to the transmission width of the second external resonator centered at the resonance frequency of the first external resonator.

9. A laser light generating apparatus, comprising:

a laser light source;

a first external resonator having a gain medium therein;

a second external resonator disposed at a stage succeeding the first resonator;

a phase-modulator disposed on an optical path between the laser light source and the first external resonator, the phase-modulator being applied with a modulation signal;

a signal generating unit configured to generate the modulation signal applied to the phase-modulator;

a nonlinear optical element disposed in the external resonators other than the first external resonator, configured to implement a wavelength conversion of an incident laser light;

an optical path length varying unit configured to vary an optical path length of each of the first and second external resonators;

at least one photodetector configured to receive the laser light emerging from each of the first and second external resonators; and a control circuit having a negative feedback arrangement configured to acquire at least one detection signal received by the at least one photodetector and the modulation signal to thereby obtain an error signal for each of the first and second external resonators, and configured to control the optical path length varying unit using the error signal according to an FM sideband method, wherein the first and second external resonators are each held simultaneously in a resonance state by setting a frequency of the modulation signal to be equal to a value which is obtained so that S/N ratios of the error signal for each of the first and second external resonators may be averaged, and by controlling the optical path length of each of the first and second external resonators by the control circuit, wherein a frequency of sidebands generated by a phase modulation of the laser light is set in a first range of from 0.5 to 2 times a first frequency range corresponding to a transmission width, in terms of half width at half height, of the first external resonator centered at a resonance frequency of the first external resonator, and simultaneously in a second range of at least 0.5 times a second frequency range corresponding to the transmission width of the second external resonator centered at the resonance frequency of the first external resonator.

10. A laser light generating apparatus, comprising:

a laser light source;

a first external resonator having a gain medium therein;

a second external resonator disposed at a stage succeeding the first resonator;

a phase-modulator disposed on an optical path between the laser light source and the first external resonator, the phase-modulator being applied with a modulation signal;

a signal generating unit configured to generate the modulation signal applied to the phase-modulator;

first and second nonlinear optical elements respectively disposed in the first and second external resonators, configured to carry out a wavelength conversion of a laser light incident on each of the first and second external resonators;

an optical path length varying unit configured to vary an optical path length of each of the first and second external resonators;

at least one photodetector configured to receive the laser light emerging from each of the first and second external resonators; and a control circuit having a negative feedback arrangement configured to acquire at least one detection signal received by the at least one photodetector and the modulation signal to thereby obtain an error signal for each of the first and second external resonators, and configured to control the optical path length varying unit using the error signal according to an FM sideband method, wherein the first and second external resonators are each held simultaneously in a resonance state by setting a frequency of the modulation signal to be equal to a value which is obtained so that S/N ratios of the error signal for each of the first and second external resonators may be averaged, and by controlling the optical path length of each of the first and second external resonators by the control circuit, wherein a frequency of sidebands generated by a phase modulation of the laser light is set in a first range of from 0.5 to 2 times a first frequency range corresponding to a transmission width, in terms of half width at half height, of the first external resonator centered at a resonance frequency of the first external resonator, and simultaneously in a second range of at least 0.5 times a second frequency range corresponding to the transmission width of the second external resonator centered at the resonance frequency of the first external resonator.

* * * * *